(12) United States Patent
Fish et al.

(10) Patent No.: US 10,055,771 B2
(45) Date of Patent: Aug. 21, 2018

(54) ELECTRONIC PERSONAL COMPANION

(71) Applicants: Robert D. Fish, Tustin, CA (US);
Skylar P. Fish, Tustin, CA (US)

(72) Inventors: Robert D. Fish, Tustin, CA (US);
Skylar P. Fish, Tustin, CA (US)

(*) Notice: Subject to any disclaimer, the term of this patent is extended or adjusted under 35 U.S.C. 154(b) by 0 days.

(21) Appl. No.: 15/357,686

(22) Filed: Nov. 21, 2016

(65) Prior Publication Data

US 2017/0161811 A1    Jun. 8, 2017

Related U.S. Application Data

(63) Continuation of application No. 13/952,058, filed on Jul. 26, 2013, now Pat. No. 9,501,573.

(60) Provisional application No. 61/856,470, filed on Jul. 19, 2013, provisional application No. 61/677,377, filed on Jul. 30, 2012.

(51) Int. Cl.
*G06F 17/30* (2006.01)
*G06Q 30/06* (2012.01)
*G06Q 50/00* (2012.01)
*H04N 5/44* (2011.01)

(52) U.S. Cl.
CPC ... *G06Q 30/0613* (2013.01); *G06F 17/30241* (2013.01); *G06F 17/30265* (2013.01); *G06Q 50/01* (2013.01); *H04N 5/44* (2013.01)

(58) Field of Classification Search
CPC .......... G06Q 30/0613; G06F 17/30241; G06F 17/30265
USPC ....................................................... 707/770
See application file for complete search history.

(56) References Cited

U.S. PATENT DOCUMENTS

| 5,684,892 A | * | 11/1997 | Taguchi ................. G06K 9/64 382/187 |
|---|---|---|---|
| 5,771,307 A | | 6/1998 | Lu et al. |
| 5,897,625 A | | 4/1999 | Gustin et al. |
| 5,982,912 A | | 11/1999 | Fukui et al. |
| 6,035,294 A | | 3/2000 | Fish |
| 6,195,652 B1 | | 2/2001 | Fish |
| 6,243,699 B1 | | 6/2001 | Fish |
| 6,795,808 B1 | | 9/2004 | Strubbe et al. |
| 6,847,931 B2 | | 1/2005 | Addison |
| 7,594,172 B2 | | 9/2009 | Fish |

(Continued)

FOREIGN PATENT DOCUMENTS

EP    0614559    1/1999

OTHER PUBLICATIONS

Markoff, J., "How Many Computers to Identify a Cat?", New York Times, Jun. 25, 2012.

(Continued)

*Primary Examiner* — Shahid Alam
(74) *Attorney, Agent, or Firm* — Fish IP Law, LLP

(57) ABSTRACT

Personal companions crowd-source and/or crowd-share characterizations, and optionally raw data, from real-world, virtual and/or mixed-reality experiences. Characterizations can advantageously be stored in one or more self-evolving, structured databases, and can be organized according to objects, actions, events and thoughts. Characterizations can be weighted differently for different users, and "forgotten" over time, especially in favor of maintaining higher level characterizations. Personal companions can be used to obtain additional information, and conduct interpersonal, commercial, or other interactions or transactions.

6 Claims, 12 Drawing Sheets

(56) References Cited

U.S. PATENT DOCUMENTS

| | | |
|---|---|---|
| 7,693,898 B2 | 4/2010 | Fish |
| 7,953,219 B2 * | 5/2011 | Freedman ......... G06F 17/30867 707/737 |
| 8,165,867 B1 | 4/2012 | Fish |
| 8,203,502 B1 | 6/2012 | Chi et al. |
| 8,204,884 B2 * | 6/2012 | Freedman ......... G06F 17/30867 707/737 |
| 2004/0146183 A1 * | 7/2004 | Shimoni ................. G06T 7/248 382/103 |
| 2005/0144004 A1 | 6/2005 | Bennett |
| 2007/0088625 A1 | 4/2007 | Fish |
| 2007/0088723 A1 | 4/2007 | Fish |
| 2007/0192910 A1 | 8/2007 | Vu et al. |
| 2007/0214100 A1 | 9/2007 | Marfatia et al. |
| 2007/0219983 A1 | 9/2007 | Fish |
| 2008/0097849 A1 | 4/2008 | Ramsaier et al. |
| 2009/0103709 A1 | 4/2009 | Conway |
| 2009/0177323 A1 | 7/2009 | Ziegler et al. |
| 2009/0319270 A1 | 12/2009 | Gross |
| 2010/0325154 A1 | 12/2010 | Schloter et al. |
| 2011/0098029 A1 | 4/2011 | Rhoads et al. |
| 2011/0224898 A1 | 9/2011 | Scofield et al. |
| 2011/0271424 A1 | 11/2011 | Revol Cavalier |
| 2011/0283190 A1 | 11/2011 | Poltorak |
| 2011/0296472 A1 | 12/2011 | Soldan |
| 2012/0016678 A1 | 1/2012 | Gruber et al. |
| 2012/0022872 A1 | 1/2012 | Gruber et al. |
| 2012/0178432 A1 | 7/2012 | Fish |
| 2012/0179452 A1 | 7/2012 | Fish |
| 2012/0208600 A1 | 8/2012 | Fish |
| 2012/0231843 A1 | 9/2012 | Fish |
| 2012/0310623 A1 | 12/2012 | Fish |

OTHER PUBLICATIONS

"OneLook Dictionary Search", www.onelook.com, screen shot Jul. 26, 2013.

* cited by examiner

| | 511₁ | 511₂ | 511₃ | 511₄ | 511₅ | 511₆ | | 511ₙ |
|---|---|---|---|---|---|---|---|---|
| 512₁ | 1 | fruit | orange | round | orange | dimpled | ... | |
| 512₂ | 2 | vehicle | monster truck | monster | white | expensive | ... | Ford |
| 512₃ | 3 | person | unknown | male | young adult | | ... | PA |
| 512₄ | 4 | animal | dog | labrador | black | large | ... | old |
| 512₅ | 5 | person | Martha Smith | female | 65 | happy | ... | New Jersey |
| 512₆ | 6 | book | paper-back | Harry Potter | vol 1 | new | ... | $8.95 |
| 512₇ | 7 | symbol | Apple |  | logo | telephone | ... | |
| 512₈ | 8 | symbol | Apple |  | logo | laptop | ... | |
| 512₉ | 9 | symbol | xyz product |  | bar code | packaging | ... | |
| 512₁₀ | 10 | symbol | Wikipedia |  | QR code | t-shirt | ... | |
| 512₁₁ | 11 | symbol | George Washington | | person | standing up in boat | ... | |
| 512₁₂ | 12 | vehicle | boat | row | | | ... | |
| 512₁₃ | 13 | ambient light | low light | | | | | |
| | ... | | | | | | | |
| 512ₘ | X | building | Joe's house | 2.5 | 5600 | residential | ... | split-level |

Figure 5A

| | $521_1$ | $521_2$ | $521_3$ | $521_4$ | $521_5$ | $521_6$ | | $521_x$ |
|---|---|---|---|---|---|---|---|---|
| $522_1$ | 1 | fruit | color | shape | texture | | ... | |
| $522_2$ | 2 | vehicle | type | color | cost | wheel size | ... | logos |
| $522_3$ | 3 | person | gender | age | disposition | city | ... | state |
| $522_4$ | 4 | laptop | chipset | screen size | internal memory | mass storage | ... | color |
| $522_5$ | 5 | animal | breed | color | size | weight | ... | age |
| $522_6$ | 6 | book | name | volume | condition | year | ... | price |
| $522_7$ | 7 | symbol | name | image | type | context | ... | |
| $522_8$ | 8 | building | stories | sq ft | type | materials | ... | layout |
| $522_9$ | 9 | chair | type | num of legs | armrest | materials | ... | covering |
| | ... | | | | | | | |
| $522_y$ | m | car | make | model | year | mileage | ... | color |

Figure 5B

|  | $511_7$ | $511_8$ | $511_9$ | $511_{10}$ | $511_{11}$ | $511_{12}$ |
|---|---|---|---|---|---|---|
| $512_1$ | 791613 | personal | 06/15/13 | 06/15/23 | 3 | |
| $512_2$ | 8979131 | personal | 06/10/12 | | 3 | |
| $512_3$ | 631616 | shareable | 07/15/11 | 07/15/23 | 3 | father |
| $512_4$ | 112 | shareable | 06/15/13 | | 3 | father |
| $512_5$ | 64379 | shareable | 06/15/11 | | 1 | employee |
| $512_6$ | 63667 | shareable | 06/15/12 | | 1 | |
| $512_7$ | 63667 | family | 03/15/12 | | 5 | |
| $512_8$ | 697433 | family | 06/15/11 | | 3 | |
| $512_9$ | 448 | shareable | 04/15/13 | | 3 | |
| | ... | | | | | |
| $512_m$ | 999733 | shareable | 06/15/13 | | 3 | |

| | | $611_1$ | $611_2$ | $611_3$ | $611_4$ | $611_5$ | $611_6$ | ... | $611_n$ |
|---|---|---|---|---|---|---|---|---|---|
| $612_1$ | 1 | moving | driving | fast | | recklessly | ... | |
| $612_2$ | 2 | moving | walking | slowly | in circles | haltingly | ... | |
| $612_3$ | 3 | eating | eating | quickly | hungrily | voraciously | ... | |
| $612_4$ | 4 | speaking | speaking | slowly | English | carefully | ... | clearly |
| $612_5$ | 5 | reading | reading | slowly | | quietly | ... | |
| $612_6$ | 6 | posture | standing | | | | ... | |
| $612_7$ | 7 | posture | sitting | | | | ... | |
| $612_8$ | 8 | group purchase | 10 | 2012-11-30 | Joe Peterson | $88,000 | ... | |
| $612_9$ | 9 | getting into bed | | | | | | |
| $612_{10}$ | 10 | driving | | | | | | |
| | ... | | | | | | | |
| $612_m$ | m | sports | playing | golf | slowly | poorly | ... | |

620

| | | $621_1$ | $621_2$ | $621_3$ | $611_4$ | $621_5$ | $621_6$ | ... | $621_x$ |
|---|---|---|---|---|---|---|---|---|---|
| $622_1$ | 1 | moving | speed | direction | manner | | ... | |
| $622_2$ | 2 | eating | speed | manner | manner | | ... | |
| $622_3$ | 3 | sports | activity | manner | skill | | ... | |
| $622_4$ | 4 | speaking | speed | language | manner | volume | ... | clarity |
| $622_5$ | 5 | posture | | | | | ... | |
| $622_6$ | 6 | group purchase | num buyers | date close | contact | price | ... | |
| | ... | | | | | | | |
| $622_y$ | y | reading | speed | language | volume | clarity | ... | |

| | $711_1$ | $711_2$ | $711_3$ | $711_4$ | $711_5$ | $711_6$ | $711_n$ |
|---|---|---|---|---|---|---|---|
| $712_0$ | name | actor | action | object of action | prep. object | ... | outcomes |
| $712_1$ | 1 quiet evening | <Object rec 5> | <Action rec 5> | | | ... | |
| $712_2$ | 2 reading | <Object rec 5> | <Action rec 5> | <Object rec 6> | | ... | |
| $712_3$ | 3 reading aloud | <Object rec 5> | <Action rec 5> | <Object rec 6> | <Object rec 3> | ... | |
| $712_4$ | 4 walking dog | <Object rec 3> | <Action rec 2> | <Object rec 4> | | ... | happy |
| $712_5$ | 5 accident | <Object rec 2> | <Action rec 1> | | | ... | accident |
| $712_6$ | 6 Appl logo | <Object rec 7> | | | | ... | <URL for Apple> |
| $712_7$ | 7 XYZ barcode | <Object rec 8> | | | | ... | <URL for XYZ company> |
| $712_8$ | 8 Wiki QR code | <Object rec 10> | | | | ... | <URL for Wikipedia> |
| $712_9$ | 9 XYZ barcode | <Object rec 9> | | | | ... | <URL for ABC company> |
| $712_{10}$ | 10 George Washington | <Object rec 11> | <Action rec 6> | | <Object rec 12> | ... | pride in America |
| $712_{11}$ | 11 George Washington | <Object rec 11> | <Action rec 6> | | <Object rec 12> | ... | revolutionary war |
| $712_{12}$ | 12 George Washington | <Object rec 11> | <Action rec 6> | | <Object rec 12> | ... | <URL for ABC company> |
| $712_{13}$ | 13 George Washington | <Object rec 11> | <Action rec 6> | | <Object rec 12> | ... | Washington: A Life |
| $712_{14}$ | 14 XYZ barcode | <Object rec 9> | | | | ... | breaks easily |
| $712_{15}$ | 15 Buy Monster Truck | <Object rec 2> | <Action rec 6> | | | ... | |
| | ... | | | | | | |
| $712_m$ | m | | | | | ... | |

Figure 7

| 1 | Sleep when | event=getting into bed | event=going into bathroom | | ... | |
|---|---|---|---|---|---|---|
| 2 | Wake when | event=getting up from bed | object=leaving bathroom | | ... | |
| 3 | Focus | object=fruit | object=friend | object=co-worker | ... | events=danger |
| 4 | Interaction Level | adult | | | ... | |
| 5 | Language | English | | | ... | |
| 6 | Translation Service | Google Translator | | | | |
| 7 | Monitor other personal companion | 6465489 | phone=714-555-9999 | events=danger | ... | |
| 8 | Current Persona | employee | produce manager | | | |
| 9 | Send raw audio data to | jsmith@smithe-com | | | ... | |
| 10 | Warning | object= body odor | object=low on gas | event=child driving with drunk friend | | |
| 11 | Keep track of | object=wristwatch | object=Julie | | | |
| 12 | Reminders | turn down the heat upon event=leaving the house | buy more milk upon event=milk getting low | send card upon event=1 week until wife's birthday | | |
| 13 | Actions | stop car upon object=user is drunk | order flowers upon event= 1 week until wife's birthday | call ambulance upon event= Perla fell and didn't get up | | |

Figure 9

ELECTRONIC PERSONAL COMPANION

This application is a continuation of U.S. application Ser. No. 13/952,058 filed Jul. 26, 2013, and claims priority to U.S. provisional patent application No. 61/856,470, filed Jul. 19, 2013, and U.S. provisional patent application No. 61/677,377, filed Jul. 30, 2012, both of which are incorporated herein by reference in their entirety.

FIELD OF THE INVENTION

The field of the invention is personal companions.

BACKGROUND

The following description includes information that may be useful in understanding the present invention. Unless the context indicates otherwise, the text should not be interpreted as an admission that any of the information provided herein is prior art to the claimed inventions, or that any publication specifically or implicitly referenced is prior art. Moreover, it should be appreciated that portions of this background section describe aspects of the inventive subject matter.

Humans are social creatures who tend to seek out community with others. There are, of course, numerous real-life communities that rely on face-to-face encounters, but often disparate interests, geographic separation, age, gender and other differences can make real-life communities difficult to access or maintain. Facebook™ and other social media have been successful in filling in some of the void, but many individuals still find that currently available, electronically accessed communities are poor substitutes for real-life companions.

What is needed is an electronic personal companion (usually referred to hereinafter simply as a "personal companion") that can act as a friend, providing information, warnings and other guidance, conversation, solace, and so forth, and can also act as an interface with other people or things. That goal has been depicted in science fiction, but has never been realistically enabled.

Crowd-Sourcing and Crowd-Sharing

The current inventors have concluded that personal companions can most effectively be implemented where they utilize one or both of crowd-sourcing and crowd-sharing. See Table 1 and corresponding description below.

TABLE 1

| | Many Distantly Separated Receivers Actively Obtain & Use Information And/Or Other Items | Many Distantly Separated Receivers Passively Obtain & Use Information And/Or Other Items |
|---|---|---|
| Many Distantly Separated Providers Actively Provide Information And/Or Other Items | Crowd-Sourcing (e.g. Digg ™, Facebook ™, Pinterest ™, Twitter ™) | Crowd-Sharing |
| Many Distantly Separated Providers Passively Provide Information And/Or Other Items | Crowd-Sourcing (e.g. medical telemetry devices) | Crowd-Sharing |

As used herein, "crowd-sourcing" refers to situations where many (defined herein to mean at least a hundred) distantly separated individuals collectively provide information, services, ideas, money, transaction opportunities and/or other items in a manner that enables others to make use of those items in some meaningful manner.

As used herein the term "distantly separated" refers to individuals that are out of unaided earshot and eyesight. Depending on the number of distantly separated individuals participating as providers of information or other items, a system, method, topic, circumstance, etc could be narrowly crowd-sourced (100-999 providers), moderately crowd-sourced (1000-999,999 providers), or massively crowd-sourced ($\geq 1,000,000$ providers).

The recitation of ranges of values herein is merely intended to serve as a shorthand method of referring individually to each separate value falling within the range. Unless otherwise indicated herein, each individual value within a range is incorporated into the specification as if it were individually recited herein.

Also, unless the context indicates otherwise, the terms "individuals" "users", "persons" should all be interpreted interchangeably to include live human beings, thinking machines, and virtual and mixed-reality beings.

Crowd-sourcing" can be active or passive on the part of the individuals providing the information or other items. Examples of active crowd-sourcing include Digg™, Facebook™ YouTube™, Pinterest™, Twitter™ and many others, each of which allows millions of users to provide commentary, still and video images, or other types of information to other users. Wikipedia™ focuses on encyclopedic and other reference materials along the same lines, and Kickstarter™ does something similar for funding of projects. In all those cases, an active, conscious effort is required for an individual to provide the information, pledge money, or provide other items. Even if the effort is something as simple as clicking "like" or "dislike" icons, the provider must speak, type, or take some other affirmative action with respect to the particular item being provided.

Examples of passive crowd-sourcing include telemetry devices that upload biometric data (blood pressure, heart rate, blood gases, and so forth) to health care providers. For example, a heart monitor might periodically send pulse and blood pressure data to a hospital, with no specific effort being required at all by the wearer. Indeed, such devices would typically operate even if the wearer is asleep or unconscious. If the hospital collects such data from many individuals without those individuals taking active steps with respect to the particular data items (i.e., efforts besides just setting up the devices to capture the information), the data can be interpreted herein as being passively crowd-sourced. Outside the medical field, automatic uploading of image data from many Google Glass™ wearers could also be considered passive crowd-sourcing.

Other examples can be found in the field of on-line or directed surveys, where it is known for companies to use cell phones or other person-carried devices to solicit survey information from hundreds or even thousands of people in a crowd-sourced manner.

What is not done in the prior art of crowd-sourcing, however, is for many person-carried devices to solicit information from their corresponding users in an auditory, conversational manner, and then make that information widely available to others in a manner that weighs the solicited information for the receivers. What is also not done in prior art crowd-sourcing is for the devices that solicit information to be closely associated with their users, such that the devices are not fungible between users. Devices could use different questions or strategies to solicit information from the users, even given the very same inputs, based upon the devices' prior experiences with their users. Systems, methods and devices that do those things are contemplated herein.

Regardless of whether individuals are active or passive in providing the information or other items, the term "crowd-sourcing" is used herein where the recipients must take specific steps to receive and use individual items in a meaningfully way. For example, to effectively utilize a tag cloud found on the Digg™ website, a person must go to that website and click on one of the tags. Similarly, to effectively utilize information in a Tweet™, a recipient must access and read the Tweet™. The same is true for doctors, nurses, researchers or others to effectively utilize medical telemetry data. In each of those instances the recipient must take an active step to obtain and use individual items of information.

In contrast to "crowd-sourcing", the term "crowd-sharing" is used herein to mean situations where many recipients receive and make use of specific information or other items provided by many providers in a passive manner.

Under that definition, Google Glass™ does not currently crowd-share. Google Glass™ can passively record raw data, and can upload it to a cloud-based server farm. But to the knowledge of the current inventors, the information is not then provided to many others in a manner that they can receive and use the information without taking some affirmative action to do so.

Similarly, Google™ Yahoo™, Bing™, Siri™, Nina™ and other search engine/question-answer systems do not currently crowd-share. They crowd-source information by crawling the Internet and other sources, and they crowd-source additional information by observing how users respond to the search results. But the users are not passively provided with the underlying crowd-sourced data; they must take some affirmative action (e.g., running a search) to use the information in any meaningful way.

As another example, many people listening to a concert or other gathering over the Internet would inevitably overhear a cacophony of hundreds or thousands of voices. That situation falls outside the scope of crowd-sharing (as the term is used herein) because any information overheard cannot be utilized by the attendees in any meaningful way without taking the active step of understanding what was said, or in some other way interpreting the noise. Even appreciating that the crowd was large and the noise immense requires an active step of interpretation.

As yet another example, advertising often utilizes subliminal messaging. An advertiser might show an attractive person drinking a particular product, and thereby seek to instill in viewers the idea that drinkers of their product are attractive. Similarly, a television advertiser might flash a word, image or other message upon the screen so quickly that viewers are not consciously aware of the message. As currently practiced those instances also fall outside the scope of crowd-sharing because the subliminal messaging is basically one-to-many (advertiser to recipients), not many-to-many.

What would be crowd-sharing is where many people carry personal companions that observe and interpret the world around them, using information based at least in part upon interpretations shared by many other personal companions. In such cases, the receivers are the individuals carrying the personal companions, and it is their corresponding personal companions that receive and make use of the shared information on their behalf. In preferred embodiments, personal companions can go further, utilizing the shared information to operate devices, send communications, or do or refrain from doing other things on behalf of their users. Systems, methods and devices that do all of that are contemplated herein, but to the knowledge of the current inventors, are missing from the prior art.

As used herein, the term "crowd-facilitated" includes both crowd-sharing and crowd-sourcing.

A. Crowd-Sourcing of Image and Sound Data

To be effective for the vast majority of people, information crowd-sourced and/or crowd-shared by a personal companion must at the very least utilize ambient image and/or sound data. Following is a brief summary of how ambient image and sound data has been handled in the prior art.

Focusing first on images, prior art FIG. 1 depicts a high-level conceptual overview of how images have historically been recorded, used and stored. In each of the steps depicted, there is a left side that shows physical processing and application of images, and a right side that shows electronic processing and application of images.

In Capture step 10, a camera is used to capture an image. The camera can be pointed specifically at a target, or used in surveillance mode to capture whatever happens to be in view, or both. For most of the last 100 years cameras have used physical film 12A (left side of step 12), but of course more recently cameras have captured images electronically 12B (right side of step 12).

In Processing step 20, images are processed into physical or electronic recordings. For film, images are usually processed chemically 22A to produce negative or positive photographs, slides, movies and so forth. For digital cameras, images are usually processed electronically 22B into TIFF, JPEG, PDF, MP4 or other digital formats.

In Identification step 30, objects (people, animals, buildings, cars, symbols and so forth) captured in the images can either be identified physically through visual examination by a person 32A, or electronically using software programs operating on mainframes, personal computers, cloud services, etc 32B. Security personnel and others, for example, have long used computer-facilitated facial recognition to identify people in captured images, and the references used to make the identifications were often derived from many sources. See, e.g., U.S. Pat. No. 5,982,912 to Fukui et al. (November 1999).

In Additional Information step 40, the identities of objects derived in step 30 are used to obtain information external to the image. To continue with the security example, a person might peruse a physical folder or other physical resource 42A to look up more information about a person recognized in an image, or a computer could electronically discover 42B additional information about the person by accessing a database. See e.g., U.S. Pat. No. 5,771,307 to Lu (June 1998).

As used herein, the term "database" means any organized collection of data in digital form. A database includes both data and supporting data structures. The term "database system" is used herein to mean a combination of (a) one or more database(s) and (b) one or more database management systems (DBMS) used to access the database(s).

In Transaction step 50, the additional information is used to make a purchase or conduct some other transaction. In a physical mode 52A, for example, a security service might use an identification of a person to physically withdraw cash from a person's bank account. In an electronic mode 52B, a computer might recognize a signature to authorize an electronic transfer of the funds, see e.g., U.S. Pat. No. 5,897,625 to Gustin (April 1999), or control access to a facility, see e.g., EP614559 to Davies (January 1999). Here again, the reference data used in executing transactions was likely derived from many different sources, and therefore crowd-sourced.

In Storage step 60, the captured images, as well as information and transaction histories, are stored physically or electronically. On the physical side 62A, photographs or other physical recordings can be stored in albums, slide decks, movie canisters and so forth. On the electronic side 62B, electronic images, receipts and so forth can be stored on electronic, optical or other memories.

Astute readers will appreciate that the two sides of each of the steps 10, 20, 30, 40, 50, and 60 are readily interconvertible. For example, the box and lens of a film camera can be converted for use as a digital camera for capturing an image. Similarly, in step 20 a physical photograph 22A can be readily converted into a TIFF or electronic image 22B, and visa-versa. A physical identification 32A can be used to make electronic identifications 32B, as well as the other way around. In step 40, a printed encyclopedia or other physical resources for obtaining additional information 42A can be readily stored in electronic form 42B, and an electronic resource such as Wikipedia™ 42B can easily be printed as a hard copy 42A. In step 50, an in-person commercial transaction can be conducted entirely with exchange of physical dollars, or can just as easily be transformed into an electronic transaction using a credit card. The same is true in step 60, where a physical photo album 62A is readily interconvertible with an electronic photo album 62B.

One result of interconvertibility of the physical left-side steps with the electronic right-side steps is that the choices at each step are independent of the choices at all the other steps. For example, one can capture an image with a film camera (physical), process the image to a photograph (physical), scan the photograph to a digital image (electronic), and use a server to ID an object in the image (electronic). Then, regardless of how the image was captured or objects in an image were identified, one can discover additional information physically or electronically, conduct transactions physically or electronically, and store images, transactions and so forth physically or electronically. Accordingly, many aspects of processing image data could be considered crowd-sourced.

An analogous situation exists for sound. For example, sound recordings were originally made without any electronics, using a pen and a rotating drum. And since the advent of electronics, people have used microphones to process sounds into digital sound recordings. But physical sound recordings can be used to make electronic recordings, and visa-versa. Similarly, sounds recorded physical or electronically can be used in person to conduct a physical transaction (e.g., in person in a physical store), or an electronic transaction (e.g., over a telephone). Accordingly, many aspects of processing sound data could be considered crowd-sourced.

Crowd-Sourcing of Parameters for Characterizing Image and Sound Data

What hasn't been done in processing of image and sound data is crowd-sourcing the parameters used to characterize ambient data. For example, whether it is Interpol using electronic facial recognition to identify potential criminals, Google™ Goggles™ automatically identifying objects within images captured by a cell phone, or Aurasma™, Google Glass™ or ID™ connecting a magazine reader with a local retail store, the parameters used to resolve the identifications have always been determined by whomever/whatever controls the databases in a top-down, rather than bottoms-up, crowd-sourced manner.

Even one of my own earlier inventions, which claims speaking into a cell phone to retrieve a web page or other address, and then using the phone to contact that address, assumed that the characterization parameters were all determined in a top down manner. US2012/0310623 (Fish, Publ September 2012).

But top-down implementations for handling images, sounds, and other types of information are inherently more restrictive, and less dynamic than bottom-up systems, and are decidedly suboptimal for use as personal companions. What are needed for viable personal companions are systems that not only crowd-source ambient data, but that crowd-source the parameters used in interpreting the data.

Crowd-Sourcing Parameters for Goods and Services

There has already been considerable work in crowd-sourcing parameters for use in buying and selling goods and services. Several of my earlier inventions, for example, involved databases that use parameter-value pairs to describe goods and services for sale or purchase. See U.S. Pat. No. 6,035,294 (Fish, March 2000), U.S. Pat. No. 6,195,652 (Fish, February 2001) and U.S. Pat. No. 6,243,699 (Fish, June 2001). Databases according to those 2000-era patents, which have been referred to over the years as BigFatFish™ or BFF™ patents, are self-evolving in that they allow ordinary users (i.e., non-programmers) to describe products and services using whatever parameters (i.e., features or characteristics) they like. Thus, instead of a programmer or business deciding what parameters can used to describe the goods and services (top-down model), ordinary users collectively determine what parameters are available (bottom-up model).

References to "I", "me" or "my" in this application refer to the first named inventor herein, Robert Fish. The '294, '652 and '699 patents, as well as all other extrinsic materials discussed herein, are incorporated by reference in their entirety. Where a definition or use of a term in an incorporated reference is inconsistent or contrary to the definition of that term provided herein, the definition of that term provided herein applies and the definition of that term in the reference does not apply.

One key benefit of bottom-up systems is that they are inherently self-evolving. For example, instead of being limited to describing an automobile by the usual parameters of make, model, year, mileage, condition, and price, ordinary users can add additional parameters such as color, leather interior, tow package, and so forth. Those new parameters, along with older parameters, are then displayed as choices to subsequent users. As another example, Monster.com and other employment web sites currently limit parameterized data to the fields of job title, educational requirement, years of experience, and so forth. Users cannot add new parameters that might be relevant for them, such as preference for large or small firms, preference for night or day shifts, need for flex time, and so forth. Self-evolving databases, however, can do that, and in that manner can evolve to accommodate the needs of whoever is using the system.

To avoid anarchy in user's descriptions of goods and services, the 2000-era patents contemplated that parameter choices would be displayed to subsequent users along with some sort of indication as to their relative prior frequencies of use. Since users will naturally lean towards using the more popular parameters, the popular parameters will tend to become even more popular, and the less popular parameters will tend to become obsolete, eventually being eliminated from the system. In that manner self-evolving databases according to those 2000-era patents should be able to automatically balance the benefits and drawbacks of creativity with those of conformity.

The 2000-era patents also applied the same self-evolving concepts to the values of parameter-value pairs. For the parameter of "color", for example, most users would likely describe red cars using the value of "red". Others, however, might prefer to describe a red car using the value of "rose", and my self-evolving systems would accommodate that inconsistency by allowing users to use either term. Subsequent users would then be shown both terms as choices, relying on font size, list ranking or some other method to designate the value "red" as having been used more frequently than value "rose". In that manner the model once again balances creativity with conformity, allowing users to employ whatever values they think are best, but encouraging them to use values that others collectively think are best.

The 2000-era patents contemplated that addition of new parameter and value terms to the system would be automatic—i.e., without interference, checking or other vetting by a human or automated arbiter. If someone wanted to add the parameter "banana" to describe an automobile or a chair, he would be allowed to do that (the pronouns "he" and "his" should be interpreted herein to include both male and female). The idea was that vetting of new parameters (via human or machine) was unnecessary because nonsensical parameters would typically begin at the conceptual bottom of any listing, and would be eliminated from the system relatively quickly through non-use. Vetting may turn out to be unnecessary in practice, but just in case I disclosed the concept of vetting terms in self-evolving databases a few years later in one of my subsequent applications, US2007/0088625 (Fish, Publ April 2007).

Several months after the priority date of the '625 application, Google™ began publicly experimenting with GoogleBase™, a vetted self-evolving database for the sale of goods and services. Although GoogleBase became quite successful, with millions of records being added in only a few weeks, Google™ quickly pulled the plug. Although it was never admitted to be the case, the problem was apparently that widespread adoption of that technology would likely have significantly reduced Google's AdSense™ revenue. After all, a self-evolving marketplace would very efficiently allow users to find exactly what they were looking for, rather than forcing them to scour the Internet in a manner that triggers hefty advertising revenue. In addition, GoogleBase was less effective than it could have been, because it only contemplated half the concept—crowd-sourcing of the parameters. Google™ apparently never appreciated the benefit of crowd-sourcing values.

Others, however, have appreciated the benefits of crowd-sourcing descriptive values. Digg™, for example, allows users to associate descriptive keywords with web-pages of interest. In a Digg-type system, a user might characterize a web-page as being "awesome" or "insightful", and if other users characterize the same web-page using the same values, those terms would be listed in a large font in a tag cloud, or designated in some other manner as being popular. In my terminology, such descriptors are merely values of the parameter "rating." It is fascinating that Google™ never appreciated the benefits of crowd-sourcing values, and Digg-type systems never appreciated the benefits of crowd-sourcing parameters.

Even the user-contributed encyclopedias such as Wikipedia basically do the same thing as Digg; they characterize web pages by crowed-sourced keywords (i.e. values) rather than a combination of both crowd-sourced parameters and crowd-sourced keywords. Modern search engines are also similar, in that they index substantially all words in web pages and other documents, and thus effectively utilize almost all words as keywords. But there again the systems fail to crowd-source parameters.

The strategy of crowd-sourcing values, but not parameters, typically results in over-inclusive results sets. For example, someone searching for the keywords "red' and "car" might well find a web page or article on a red-faced driver of a white car. Wikipedia-type systems address the problem with disambiguation interfaces, and Google™ and other search engines address that problem with sophisticated ranking algorithms. But both of those solutions are themselves top-down approaches that are relatively static and inflexible. Such strategies are inherently resistant to evolution, and are therefore not conducive to developing effective personal companions.

Even Watson™, the very sophisticated set of computer programs developed at IBM™ to process and store vast amounts of information, characterizes information according to pre-established "buckets". For example, Watson has a "names" database into which names of people can be extracted from newspapers, journals, phone books and other sources, and a "places" database that stores information about physical locations (New Jersey, Princeton, Egypt, etc). The "names" and other specific database buckets are in effect parameters, which are hard-coded into the system by the developers rather than relying on crowd-sourcing.

To be fair, it was not clear for many years that a bottom-up, self-evolving approach to storage and retrieval of data was even practical. The many different types of products, and the potentially millions of different types of information, could easily utilize many thousands of different parameters. Without some new invention, one would consequently need either thousands of different tables to accommodate the different goods and services and types of information, or an extremely large table having thousands of columns. Back in the 1999-2000 timeframe, I hired some of the brightest minds in database design to solve the problem of inefficient storage and retrieval attending self-evolving databases. Despite hundreds of thousands of dollars of effort, however, they were completely unsuccessful in finding a viable solution.

I finally did develop a viable solution, and filed an application on that solution in 2006, see US2007088723 (Fish, Publ April 2007). The answer was to store records in a relatively narrow table (perhaps only 50 columns) in which the different columns had different meanings for different types of products, services, etc. A second table is then used to provide keys to the meaning of the different columns for each different type of products and services. Thus, for descriptions of automobiles a cell at column 6 might store price, but for descriptions of physicians a cell at column 6 might store the number of years in practice, or the name of a practice specialty. According to a calculation in the '723 application, such a database would be extremely efficient, having the ability to store descriptions of 500 million unique items using only about 12.5 gigabytes of storage. Of particular significance in the current application is that retrieval from such a database would also be extremely fast, and highly amenable to associative searching.

Crowd-Sourcing of Documents and Stored Information In General

As noted above, my 2000-era patents were directed to buying and selling goods and services. They failed to apply the concept of crowd-sourcing characterizations to information in general, using crowd-sourced parameters. Two of my later applications, however, addressed that deficiency. U.S.

Pat. No. 7,594,172 (Fish, September 2009) disclosed aspects of using self-evolving databases for web pages and other documents, and U.S. Pat. No. 7,693,898 (Fish, April 2010) disclosed aspects of using self-evolving databases for storing information in general.

Crowd-Sourcing of Symbols

In my 2000-era patents I also never disclosed the idea of crowd-sourcing characterizations of symbols, let alone the parameters used in making such characterizations. As used herein, the term "symbols" should be interpreted broadly to include bar codes, QR (Quick Response) codes, facial and other images, photographs, videos, sounds, smells, figurines and other 3D or 2D objects, rhythms, sequences, and indeed anything used as a key to identify something else.

In the prior art, electronic resolution of symbols has apparently always been done according to top-down characterizations. For example, simple bar codes merely correlate objects with their UPC (Uniform Product Identifier) classification numbers. QR codes can be resolved to more complex information, such as a web site, but they are still resolved in a top-down manner because correlation of the code with the link or other information is pre-established by whomever or whatever is in control of the links. Even facial recognition systems link facial features to individuals using top-down databases. It is unknown to the current inventors whether there are existing infrastructures that link a given symbol to multiple, user-selectable targets. But even if such things did exist in the prior art, they would likely still have been top-down because whoever or whatever set up the correlations would want to determine what links are associated with the various target choices.

Of course the top-down resolution of symbols makes very good sense from the perspective of ordinary economic activity. For example, any company paying to link its products and services with a symbol, either in advertising or elsewhere, naturally wants to link its own products and services, website, phone number and so forth codes with that symbol, not those of its competitors. And if consumers were allowed to crowd-source links for products and services however they saw fit, a given bar code or other symbol might well become linked to images, characterizations and other information that are wholly unfavorable to the company owning the symbol. Those of ordinary skill would expect that any service that allowed the public to do that would quickly lose advertising revenue from of the owners of those symbols.

It is contemplated herein, however, that symbols can properly mean different things to different people, and that personal companions should be able to associate symbols according to the needs, wants and perspectives of both their respective users, and of others. Thus, it is contemplated herein that personal companions should crowd-source both the meanings of symbols and their associated links and other information, and that such characterizations could optionally be done using crowd-sourced parameters.

Persistence in Crowd-Sourcing/Crowd-Sharing Characterizations of Ambient Data

Crowd-sourcing of ambient data is contemplated herein to be accomplished most effectively in a persistent manner. Persistent crowd-sourcing of ambient data does not appear to have been done where the parameters are also crowd-sourced, and does not appear to have been done at all where the ambient data is crowd-shared.

As used herein, "ambient data" refers to data derived from the environment within or about a person. The "environment" is categorized herein as a tautology of objects, actions, events, and thoughts. In this context a person, or perhaps his avatar in a game world, might obtains ambient data from which an apple could be characterized as being substantially round, about first sized, has a smooth red or green surface, and optionally has a stem sticking out the top. He or his avatar might also obtain ambient data derived from a person running (action), or a car accident (an event), or a generalization or other idea, a property right, or perhaps an emotion (a thought).

Also as used herein, the term "persistent" refers to something that occurs or is sampled at a rate of at least once every 30 seconds over a five minute period, or at least a cumulative 50% of the time over a five minute period. In contrast, the term "continuous" as used herein means that something occurs or is sampled at a rate of at least every 5 seconds during a five minute period, or at least a cumulative 90% of the time over a five minute period.

It is known in limited circumstances of the prior art to use a cell phone or other camera-containing device to record an image in a user's environment, send that information to a service for identification, and then act upon the identification. It is known, for example, for a user to point his cell phone at the front of a restaurant, and have a service return a menu from that restaurant. Similarly, it is known for a user to point his cell phone at an advertisement in a newspaper, and have a service return price and availability information of a diamond ring featured in the advertisement. But those uses are all one-off searches; they do not embody persistent collection of information.

Many medical telemetry systems do collect ambient biometric data on a persistent or even a continuous basis. But those systems do not involve crowd-sourcing of parameters or crowd-sharing of data or characterizations of the data. They merely collect separate data from different patients, and make that data available to a very limited number of doctors, nurses, and interested others, and only upon those individuals taking active steps to acquire and/or use the data.

Similarly, Google Glass™, GoPro™, Countour™ or other Point of View (POV) camera can collect image and sound data on a persistent or continuous basis, but the data is not interpreted using crowd-sourced parameters, and is not distributed by crowd-sharing.

Allowing users to crowd-source parameters can be especially important with respect to ambient data because the context can be very important. One of my earlier applications did disclose strategies to automatically provide guidance as to contexts in which terms are used. In US2007/0219983 (Fish, Publ September 2007), I described an improvement in which a search engine would pull up a set of records that include a search term, and then look at what terms are used in windows of perhaps 25 words on either side of the search term. Those terms would then be presented with an indication of relative frequency so that the searcher would know what additional terms are typically located nearby the searched-for term. A reverse dictionary such as that available at www.onelook.com provides another means of crowd-sourcing context correlations.

Interestingly, however, all of my earlier crowd-sourcing patent applications, as well as my earlier idea of summarizing windows surrounding search terms, and the currently available reverse dictionaries, only provide correlations as one-off searches. They do not address how context information could be used in storing persistently recorded ambient data.

One huge hurdle is that the wide range of viewing perspectives and contexts accompanying persistently recorded ambient data can make even mere identification of objects, actions, events and thoughts extremely difficult.

Those having the resources to put together sophisticated identification infrastructures to resolve those difficulties would almost certainly do so to make money from advertising, or other associations with vendors. Accordingly, they would not want users to characterize ambient data in a crowd-sourced manner because that would undercut the ability of the infrastructure provider to extract monies from the vendors.

Even an ordinary consumer would likely not appreciate the value of crowd-sourced identifications of such things. He would want his cell phone, camera or other device to identify an apple as an apple, not a pear. Similarly, he would want his cell phone or other device to identify a car accident as "a car accident", not a "meeting of the drivers".

Still another difficulty is that persistently recorded ambient data often involves a combination of different modalities (image, speech, music, animal and other sounds, smells and even vibrations). Those other modalities may well provide needed context, yet involve information that is not readily understood or properly appreciated, such as person talking in another language, a facial expression or tone of voice, or perhaps background sounds of birds. Thus, there is a need to integrate a translation system into the crowd-sourcing of persistently recorded ambient data. This could be done by adapting teachings in another one of my other patents, U.S. Pat. No. 8,165,867 (Fish, April 2012). In that system, electronics is employed to obtain information in one modality, send signals derived from that information to a distant server for analysis, and then receive back information in the same or a different modality.

Canopy

One can think of a mature forest as including trees growing so close together that the branches and leaves of one tree interact with the branches and leaves of its neighbors. In some cases the branches can even form a canopy, which then develops a life of its own.

If one analogizes a tree to a person, the roots could be viewed as corresponding to the person's history of experiences, and the branches and the leaves as corresponding to characterizations of those experiences. A tribe or other group, or even a civilization could then be viewed as an interpersonal canopy that combines memories, life experiences, observations, and so forth in a manner that has a life of its own. What is needed is an electronic type of canopy, one that would combine automatically abstracted memories and so forth in a manner that survives even when some of the source individuals die, or are otherwise removed from the collective.

Of course, in the realm of personal companions, the different people providing the information need not be close geographically or even in time, as would trees in a canopy, but could be widely distributed over space and time. Moreover, neither the tree nor the canopy concepts discussed herein should be interpreted as requiring that raw data needs to be saved. Indeed, just the opposite is more socially acceptable, as is apparent from the bad press accorded Google Glass™ with respect to privacy issues surrounding recordation of raw data.

Personal companions preferably store characterizations of the ambient data, such as topics discussed, or observations as to whether the other people seemed happy. Yes, they might also store some raw data, either for later local processing or for transmission to a distal processor. But all of the raw data need not, and preferably should not be maintained. It might instead be useful to store only a relatively small number of frames (or segment) from a video for the short term, and then even fewer frames (or a shorter segment), or perhaps line drawings derived from the video, for the long term. Here it is important to appreciate that there can be a need to store both characterizations that are in the same modality as the raw data (e.g., frames from a video), and those in different modalities as the raw data (e.g., the word "happy" from a video image). Moreover, preferred personal companion should be capable of automatically individualizing these characterizations in different ways for different users, or even in different ways for the same user depending upon circumstances.

Thus, in a manner akin to human short term, medium term, and long term memories, there is a need for personal companions to abstract raw data, and then delete some or all of the raw data. For example, a person need not remember all the details of buying groceries at the supermarket. That would only clog up his mind. Instead, he would tend to remember what was purchased only for a medium term. In the long term he might only remember having visited that particular grocery store on various occasions, and eventually he might forget about the grocery store altogether. Personal companions should be able to do something analogous, locally and/or in the canopy.

Not only is it useful to delete raw data over time, in favor of characterizations, but there is also a need for personal companions to hide particular information from others, and possibly at times even from the person who generated, recorded, or abstracted it. For example, a person might well want to forget details, or even the existence, of a given event because the event was embarrassing or painful. Personal companions should be able to do something analogous, locally and/or in the canopy.

The opposite is also true, that there is a need for systems, methods, and apparatus that specifically make some information available to one or more others. For example, it is known for a baby monitor to provide a parent with a live video or audio feed from a nursery. But it would also be useful if the parent could automatically receive characterizations from a system carried by the baby, or perhaps the baby's caretaker, with updates such as "Joey just ate" or "Joey went to sleep".

It is interesting that the LiveScribe™ pen is useful primarily because it correlates characterizations with raw data. In that system a special pen has a camera that records movements of the tip on a specially printed piece of paper, and a microphone that records conversations and other sounds. When a user takes notes of a conversation or lecture, the system correlates the notes with whatever words were being spoken, and whatever sounds were received by the device when the notes were taken. The notes are characterizations, but they are not stored as parameter-value pairs. Some contemplated embodiments of personal companions should be able to do what LiveScribe™ does, but should also be able to abstract automatically, using crowd-sourced parameters, and then crowd-share the data and characterizations as appropriate.

Handling Variant, Inconsistent, and Incorrect Characterizations

Most computer programming is designed for consistency in results. For example, in known object recognition software, different instances of the same software can be expected to provide the same characterization. If an instance of Midomi™, Musipedia™, Tunedia™ or Shazam™ accessed by one cell phone identifies a song on the radio from a 10 second sound segment, another instance of the same service operating on another person's cell phone at the same time would be expected to make the very same identification. Similarly, if one instance of an airport security X-ray system identifies an object as a knife, every other instance of that same system can be expected to yield the same result when presented with exactly the same image. In other words, the prior art teaches unambiguous links of images to targets; one to one or many to one correlations.

That isn't necessarily helpful. In the airport example, a terrorist need only learn how to get past one instance of a currently deployed screening system to be relatively assured of circumventing all similar screening systems. If different instances of the same system produced variant results under identical circumstances, a person trying to sneak contraband onto a plane could never be sure of passing a particular checkpoint.

Humans do not necessarily want their characterizations to be consistent with everyone else's. And since humans may have very different desires and perspectives, there is a need to build potential variances into personal companions with respect to the way different objects, actions, events and thoughts are treated. For example, in a grocery store, it might be useful if different employees could train their personal companions to have different levels of specificity in describing fruit. One person might want his personal companion to characterize a given apple as an apple, whereas another person would want his personal companion to characterize the banana as a Macintosh apple, or as being overly ripe. Similarly, a person living in a snowy climate might want to train his/her personal companion to be more specific in describing different type of snow than someone in a warm climate.

In addition to supporting variant or inconsistent information, which is thought herein to be desirable in at least some circumstances, there is also a need to deal with intentionally wrong information in a crowd-sourced environment. For example, it is known for companies to game a bulletin ranking service by uploading positive comments about their own products, and negative comments about their competitors' products. Facebook™, Wikipedia™ and others have tried to address that problem by focusing on comments from "friends", or weighing comments according to the number or accuracy of posts a person has historically provided to the system. But all of those systems can still be spoofed by individuals using multiple user names.

What are needed are systems, methods, and apparatus in which crowd-sourced ambient data is registered or otherwise linked to physical devices that provide the data. For example, if a physical device is regularly worn by a person during significant portions of that person's daily routine, it should be possible to extract from a mirror or other reflected image who the person is. Similarly, the combination should be able to distinguish bona-fide commentators from corporate shills by the frequency and content of their characterizations.

Conversations, Guidance, Warnings

There have been numerous efforts over the years to have computers identify objects, or characteristics of objects (ripeness of fruit, etc), by their visual appearances. As discussed above, prior efforts are almost entirely top-down. In July 2012 Google™ announced their cat identifier, which apparently used a neural net of 16,000 processors and ten million images to effectively crowd-source what a cat looks like. Although an impressive feat at the time, a practical personal companion needs to quickly and inexpensively obtain characterizations from interactions with humans, either directly from its user, or through interactions with other personal companions. Viable ways of doing that are described herein.

In particular, personal companions should be able to obtain characterizations of the world from conversations with humans, preferably by asking questions using audible speech. For example, when the camera of a user's personal companion sees another person, the user might say "Hi Jacob". From that exchange the companion could automatically associate features derived from an image of that person with the name "Jacob". Alternatively or additionally, the companion might ask "Who is that person?", or if the companion knows the person's first name but not the last name, it might ask "What is Jacob's last name?" As another example, it would be desirable if the camera of such a device were worn so that a user could put a banana in its view and say "This is a banana" or "This banana is over-ripe. You can tell by the brown color of the peel". The companion would then associate brown color on a banana with over-ripeness.

Another need is for personal companions to interact with a user as would a friend, abstracting information from activities of the user, or other sources, and possibly admonishing that user when something seems awry, or to make a suggestion. By way of contrast, current GPS systems are known that request information such as a destination, and even suggest different routes based upon preferences. But all of that is top-down programmed. Two similarly situated people (using the same software on the same model cell phone, in the same position in a traffic jam, at the same time of day, with the same destination and the same selected preferences) would get the same directions and even the same questions ("press 1 to select alternate route") from their cell phones. A human friend, however, would know personal information about the driver, and might know that on this particular day the driver is not in a rush, and would be happy sitting in traffic listening to the radio. The human friend would have that information based on characterizations of the driver's behavior, not by the driver explicitly setting preferences. It would be helpful if a personal companion could do that. In another example, a person might be walking along at a swap meet. When he stops to buy some unneeded item, his personal companion might admonish him about spending too much money.

Another thing that a human friend does is provide guidance as to specific purchasing decisions. There are, of course, already systems that provide some aspects of purchasing and other guidance to consumers according to crowd-sourced comments. Examples include the "like/dislike" choice on Facebook™, and the "MustGo/Go/so-so/No/OhNo" movie rating system of Fandango™. But those systems are highly simplistic, and are of limited use because of the almost non-existent capability for sorting and filtering of the comments.

My 2000-era patents disclosed interfaces where consumers could sort products and services according to whatever characteristics were of interest to the searcher. That technology, however, stopped short of teaching how to provide purchasing and other guidance to consumers when a display screen is inconvenient or unavailable. For example, if a shopper saw a product advertised on a TV, billboard, or in a store, it would be useful for his/her personal companion to conduct a conversation regarding a possible purchase, without the shopper having to pull out his cell phone or tablet. In particular, it would be helpful to have the companion say something along the lines of "The most common reported characteristics of this product are "ease of use, price, and durability. Would you like information about any of those?" If the shopper then said "Tell me about durability", the companion might respond "In 1115 characterizations, 30% said very durable, 28% said yes, and 24% said pretty good."

Similarly, it would be useful if the conversation could provide information that compared "apples to apples", e.g., price per gram or mg for foods or vitamins. In many instances that would require calculations to be performed on available data, and then that data to a user in a conversational format. As a simple example, it would be useful if a user could inquire in a conversational format something along the lines of "How many Chinese restaurants are in Burbank?" or "How many Chinese restaurants are within a half hour drive of my current location?"

Discussion herein regarding the value of spoken conversation is not meant to completely discount the value of providing visuals to a person, whether through glasses, a hand-held or desk-top device, or otherwise. What is needed, however, is the ability of a personal companion to help visualize the information in a compact format, such as sortable and filterable tables, and allow the user to control the presentation (perhaps sort or filter the records of a table) as part of a spoken conversation. Whereas a user might be able to get a name of a restaurant or an address by asking Google Glass™ "where is the nearest Chinese restaurant?", it would be more useful the system would review the characteristics used to classify restaurants or Chinese restaurants, and then come back with a question such as "Are you looking for fast, cheap, or for fine dining?"

Another need (at least from the perspective of the current inventor) is for systems, methods, and apparatus that reduce the impact of advertising on decision making. For example, Google™ auctions placement of advertising on its search results pages. Whoever pays the most gets his link moved to the top, or in some other desired position. Most recently, Google™ has even blurred the distinctions between advertised records and search-ranked records, making the advertising more effective from the advertisers' point of view, but potentially reducing the value of the search results to the user.

Even where users have some very limited control over the ranking algorithm, as in Google™ Shopping, Google™ puts advertisers on the top. And of course, Google™ Shopping can only rank products according to price and relevance, which forces the user to look through page after page (with new advertisements each time) to ferret out other product characteristics such as free shipping. What is needed is for personal companions to provide search results to a requester, preferably in a conversational or tabular format, which would give a user the option of eliminating or at least reducing the advertising.

SUMMARY OF THE INVENTION

All of the aforementioned objects and advantages can be achieved by preferred systems, methods, and apparatus in which (1) multiple individuals carry sensors on their persons or clothing, (2) ambient data is persistently or continuously received by the sensors, and at least one of (3a) the data is automatically characterized (i.e., abstracted) using crowd-sourced parameters, and (3b) the raw data and/or characterizations are provided to others in a crowd-shared manner.

In terms of physical embodiments, information is preferably obtained using a "sensor module" carried by or on a person. At a minimum, sensor modules are likely to include a camera and a microphone, so that images received by the camera can be associated with spoken parameters and/or values received by the microphone. In preferred embodiments the camera and microphone components are combined in a pin worn on clothing about the torso, as for example on the front of a shirt, blouse or jacket. Biometric, olfactory, tactile, atmospheric and/or sensors of the sensor module might well be located away from the camera and microphone, or configured as multiple or accessory sensor modules.

One or more sensors module are preferably coupled with a carried electronic device ("electronics module"), which preferably provides power, an operating system and suitable software. One or more electronics modules can advantageously provide connectivity to the outside world, via any suitable manner of wired and/or wireless connection. Preferred electronics module are small enough as to be wearable, i.e., worn in a pants pocket or in a smallish (less than 1000 or 500 cubic centimeters) hip carrier. Contemplated electronic modules can be focused mostly or entirely on the personal companion functions, but can also include properly programmed general purpose devices including smart phones, PDAs, mini-tablets, and so forth.

The electronics module can be coupled with a sensor module using a wired connection, but it is contemplated that the coupling could occur wirelessly. As electronics and power sources continue to miniaturize, a very compact sensor module could be physically adjacent the electronics module, or even be located within the same housing.

Preferred personal companions can interact with their users in any combination of active and passive modes. Among other things, users can actively or passively record raw data from their immediate environment, actively or passively abstract the raw data to determine objects, actions and/or events, and actively or passively provide the abstracted information to others according to the particular circumstances (contexts) in which those others find themselves.

Thus, personal companions can preferably operate using both crowd-sourcing and crowd-sharing. In crowd-sourcing, a personal companion could utilize the user's own previous characterizations of objects, actions, events and thoughts, and it could make such characterizations generally available to others. In crowd-sharing, a personal companion would receive data and/or characterizations from others, and then use that information to characterize objects, actions, events, and/or thoughts of the personal companion's user, without any particular effort from the user to do so. Thus, even though the wearer never told his personal companion that a green banana is unripe, his personal companion could draw that conclusion based upon passively received characterizations of others. And the wearer might not even know that his personal companion drew that conclusion.

Where there are discrepancies between a user's characterizations and those of others, the user's personal companion would preferably weight the characterizations in favor of his/her own prior characterizations relative to those made by others. This is discussed in greater detail below.

Characterizations of data are preferably stored as parameter-value pairs, using a self-evolving database. Characterizations can be collected over time from multiple objects and events encountered by a given person and sensor module, and can optionally be combined with those from other individuals and their sensor modules, and even from sensor modules not directly associated with any given person. It is contemplated that characterizations can be made within a few minutes of an object or occurrence of an event, or at some later time (as for example upon review of a day's events), or even by a person who was not even wearing the sensor module that captured the information. Not only can characterizations be crowd-sourced, but the parameters used to characterize can be crowd-sourced.

Characterizations are preferably organized according to objects, actions, events and thoughts, and can be used to obtain additional information, and conduct interpersonal, commercial, or other interactions or transactions. Characterizations can advantageously be stored in self-evolving, structured databases, such that abstracted information can be made available to some or all of others using the system.

To avoid clutter, characterizations can be "forgotten" over time, especially in favor of maintaining higher level characterizations. Thus, although raw data of video, images, sounds, biometric, environmental, and so forth can be stored indefinitely, it is preferred that over time some or all of the raw data can be lost in favor of characterizations and subsets of the raw data. For example, in place of a video of the sun rising, the system might store a characterization that on a given day the sunrise was "cloudless", "perfect" or "breezy", or it might store specific frames or a line drawing pulled from the video. Characterizations can also be further characterized to higher levels of abstraction. For example, over time characterizations of the sizes and colors of various fruits seen in a supermarket visit might be abstracted to "went shopping".

In some implementations, sensor module(s) and the system(s) that operate them can be implemented as personal companions, which make use of persistent inputs from many individuals to crowd-source characterizations and characterization parameters from real-world, virtual and/or mixed-reality experiences. Preferred implementations can observe ambient environments with little or no conscious direction from their users, but can also interact with the users in a conversational manner when appropriate.

There are numerous security implications to personal companions. Certainly it would be advantageous to have a personal companion that provides not only a potentially flawed human interpretation of what happened, but an actual video or image of the event and the perpetrator. If millions of people were to wear such personal companions, the likelihood that a crime would be caught on camera is greatly increased. In addition, raw data and characterizations combined from many different personal companions (the canopy idea) could be mined by authorities to discover links that would otherwise be difficult or impossible to find.

Various objects, features, aspects and advantages of the inventive subject matter will become more apparent from the following detailed description of preferred embodiments, along with the accompanying drawings in which like numerals represent like components.

BRIEF DESCRIPTION OF THE DRAWING

FIGS. 5A, 5B and 5C are part of an objects characterization facility. FIGS. 5A and 5C show an objects table, and FIG. 5B shows a corresponding object position-keys table.

FIG. 6 is a schematic of an actions characterization facility, and includes various actions-related data tables.

FIG. 7 is a schematic of an events characterization facility, and includes various events-related data tables.

FIG. 9 is a sample User Preferences table.

DETAILED DESCRIPTION

The following discussion provides many example embodiments of the inventive subject matter. Although each embodiment represents a single combination of inventive elements, the inventive subject matter is considered to include all possible combinations of the disclosed elements. Thus if one embodiment comprises elements A, B, and C, and a second embodiment comprises elements B and D, then the inventive subject matter is also considered to include other remaining combinations of A, B, C, or D, even if not explicitly disclosed.

All methods described herein can be performed in any suitable order unless otherwise indicated herein or otherwise clearly contradicted by context. The use of any and all examples, or exemplary language (e.g. "such as") provided with respect to certain embodiments herein is intended merely to better illuminate the invention, and does not pose a limitation on the scope of the invention otherwise claimed. No language in the specification should be construed as indicating any non-claimed element essential to the practice of the invention.

Throughout the discussion, references may be made regarding servers, services, interfaces, portals, platforms, or other systems formed from computing devices. It should be appreciated that the use of such terms is deemed to represent one or more computing devices having at least one processor configured to execute software instructions stored on a computer readable tangible, non-transitory medium. For example, a server can include one or more computers operating as a web server, database server, or other type of computer server in a manner to fulfill described roles, responsibilities, or functions.

Figure 1:
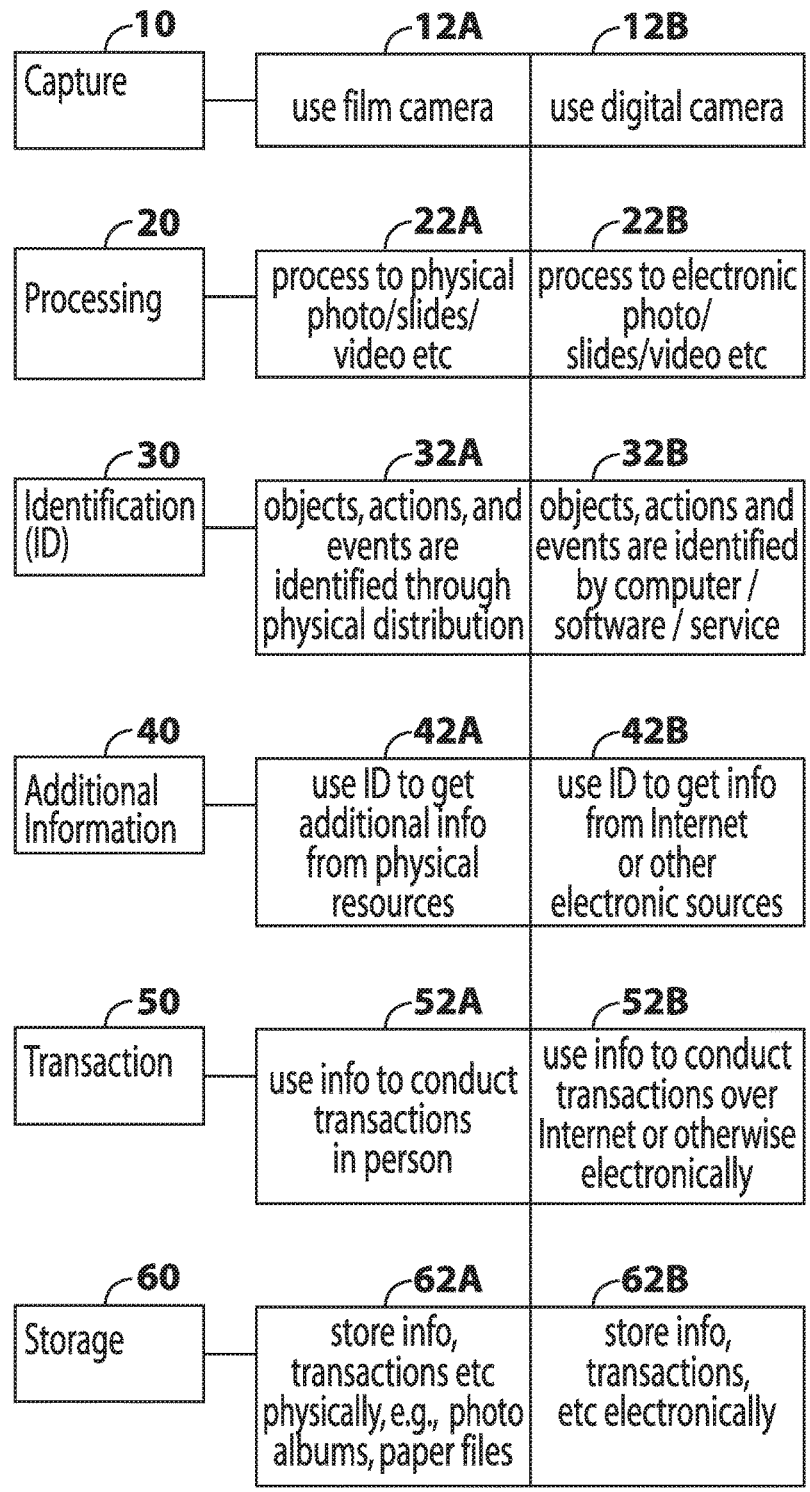
FIG. 1 is a high-level conceptual overview of how images have historically been recorded, used and stored
Figure 2:
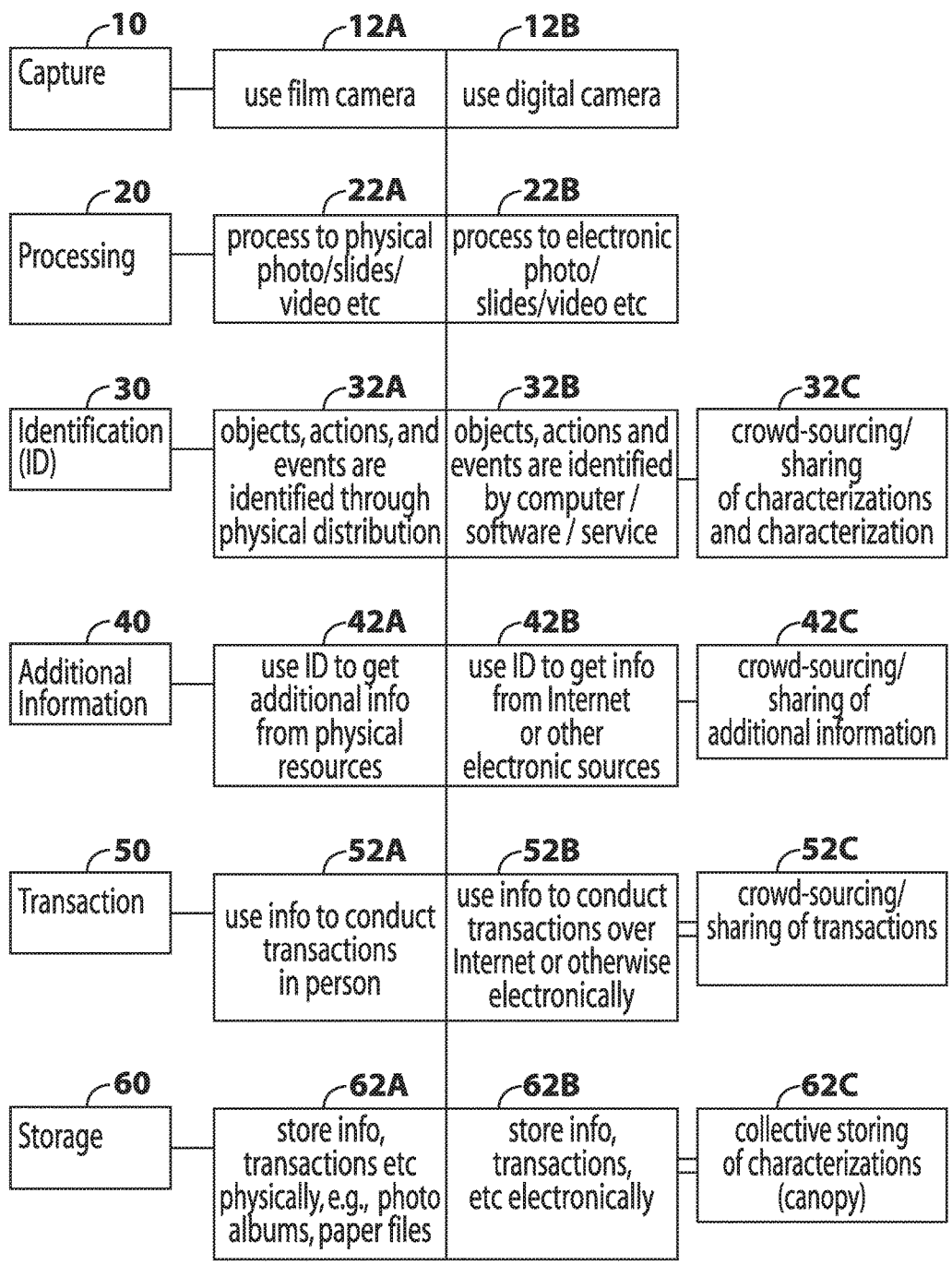
FIG. 2 is the overview of FIG. 1, annotated to include various aspects of crowd-sourcing and crowd-sharing of information.

In FIG. 2, systems, methods and apparatus are contemplated in which objects, actions, events, and thoughts are abstracted from the image data using crowd-sourced characterization s and characterization parameters 32C, additional information is procured 42C, transactions are executed 52C, and information is stored 62C, using crowd-sourced strategies. The term "parameters" is used herein to refer characteristics that can be used in combination with values to describe an object, action, event or thought.

Figure 3A:
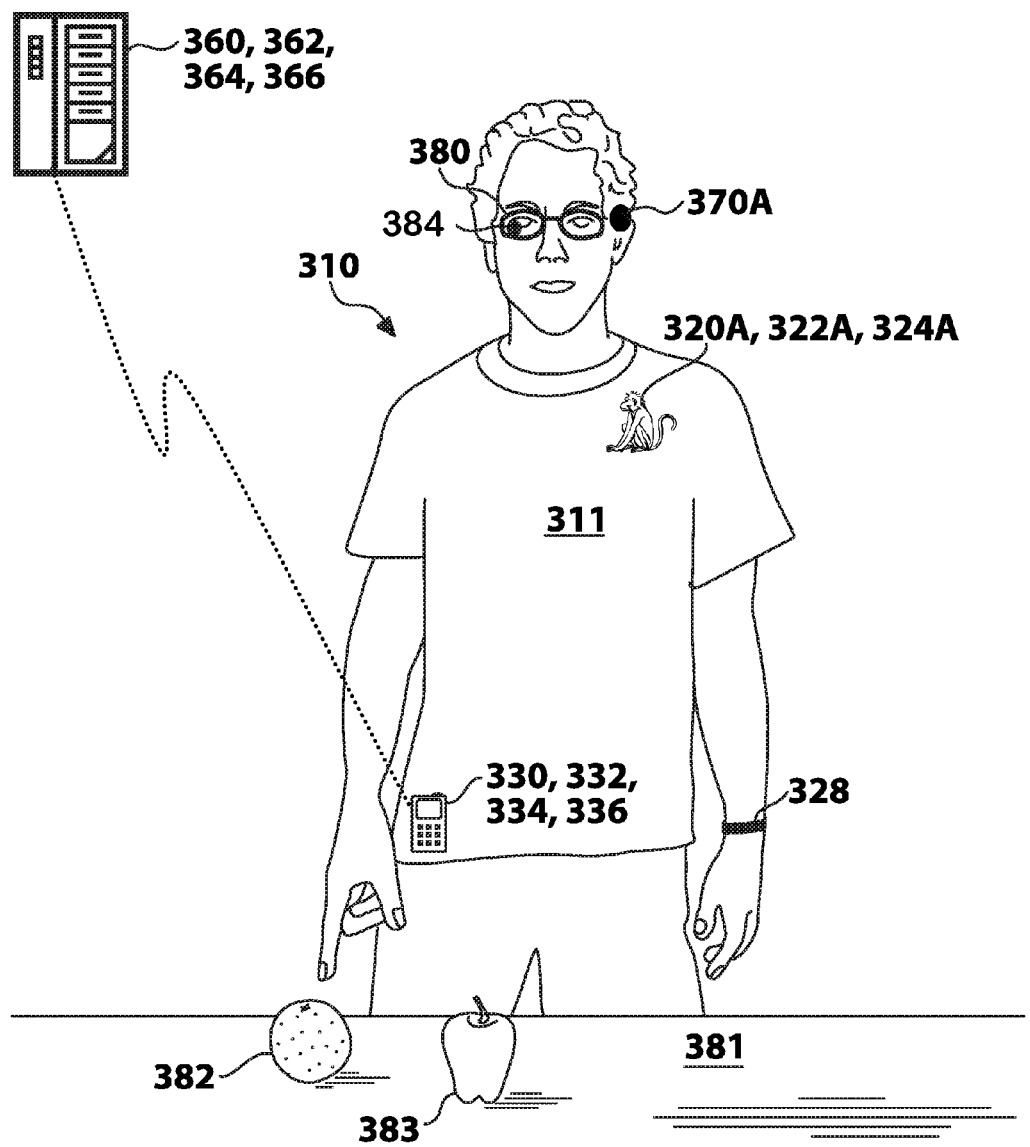
FIG. 3A is a schematic of a person using a personal companion, where the camera is included in a sensor module affixed to clothing.

In FIG. 3A, a personal companion 300A generally comprises (a) a sensor module 320A, (b) a networkable electronics module 330 including processor 332, software 334 and data storage 336 in the electronics module 330, (c) a speaker 370, and (d) a distally operated system (distal service) 360 including processor 362, software 364 and data storage 366. In this particular example, a person 310 is wearing the sensor module 320A on his shirt 311, and carries the electronics module 330 in a pocket (not shown), or a hip carrier (not shown), or perhaps a purse (not shown). The electronics module 330 has a power and data link (not shown) with the sensor module 320A and a wired or wireless link (not shown) with the speaker 370A, and is at least intermittently networked with a distally operated system (distal service) 360.

The sensor module 320A can comprise a single housing or be separated into multiple housings, and can include any practical sensor or combination of sensors, including especially a camera 322A and a microphone 324A. Other contemplated sensors can be included in the sensor module 320A, or located elsewhere on or near the body, and include those that measure pulse, blood pressure, $pO_2$ (partial pressure of Oxygen), body temperature, chemicals in the sweat, or other biometrics, and ambient temperature, humidity, movement, proximity or other environmental characteristics. In this particular example, the person 410 is wearing a pulse monitor 328 on his wrist, which is wirelessly coupled with the electronics module 330. Multiple sensors can be housed together, or be separated by several millimeters, centimeters, or any other suitable distance. Duplicate sensors can be included, as for example a backup or stereo camera (not shown).

Sensor modules are preferably small enough to be comfortably carried for hours at a time. In the case of a clothing-worn sensor module, the outwardly facing (away from the wearer) surface area could advantageously be only a few square centimeters. Sensor modules can be coupled to the clothing or wearer using a pin, band, snap, lanyard, necklace or any other suitable connector. In FIG. 3 the sensor module 320 is coupled to the upper chest area of the shirt 311 using a safety pin (not shown). Another option is to put the camera and/or microphone on an in-ear Bluetooth headset.

Sensor modules preferably have an electronically operated coating that changes color or in some other manner designates to the wearer or others that the sensor is in or out of operation. Thus, for example, a camera or other sensor that collect still, video or other images might a coating overlay on the lens that changes to red, blue, grey or some other color or pattern to designate that the sensor is off line. Similarly, a microphone or other sound sensor might have a blinking or steady light to designate that it is off line. The sensor in the images in this application should be interpreted as having such coatings or lights. In fact, it is contemplated that Google Glass™, which might or might not be utilized with abstracting systems and methods contemplated herein, could also have such coatings or lights.

As used herein, and unless the context indicates otherwise, the term "coupled to" is intended to include both direct coupling (in which two elements that are directly connected, logically or physically) and indirect coupling (in which at least one additional element is logically or physically located between the two elements). The terms "coupled to" and "coupled with" are used synonymously.

Data collected by the sensor module(s) is preferably sent to the electronics module 330, and the data flow can optionally be bidirectional. In FIG. 3 the camera 322A send images to the electronics module 330, and the networkable electronics module 330 sends focus, blackout or other operating commands to the camera 322A. A similar situation independently occurs for sounds, in which the microphone 324A sends sound data to the electronics module 330, and the electronics module 330 might send filtering or other commands to the microphone 324A. Electronics module 330 also sends sounds to the speaker 370A, which in this instance is an ear bud.

Power source(s) for the sensor module 320A, and possibly even for the electronics module 330, could be located in any suitable location, as for example, within the electronics module, or even separately from both of those devices, perhaps even in the fabric of a worn garment. In FIG. 3A, some power is provided by a battery woven into the fabric of the shirt 311, and power is carried to the networkable electronics module 330 via power cable (not shown). Batteries woven into clothing are described in US 2011/0271424 (Revol-Cavalier, Publ November 2011).

Optional glasses 380 can be equipped with an electronic display 384, which is preferably operated by electronics module 330 to show video, text or other visually perceivable information to the wearer. It is contemplated that a sensor module could be incorporated into, or attached to a pair of glasses.

It is contemplated that distally operated system (distal service) 360 can comprise any suitable computer implementation, can employ various computing devices including servers, services, interfaces, systems, databases, agents, peers, facilities, controllers, or other types of computing devices, operating individually or collectively, locally or in a distributed fashion. Interaction between (a) a local device of a given user, for example networkable electronics module 330, and (b) the distally operated system (distal service) 360, is preferably conducted as a client/server fashion, although peer-to-peer and all other suitable configurations are contemplated. Computing devices can comprise a processor configured to execute software instructions stored on a tangible, non-transitory computer readable storage medium (e.g., hard drive, solid state drive, RAM, flash, ROM, etc.). Software instructions operating on computing devices preferably configure the computing device to provide the roles, responsibilities, or other functionality as discussed herein with respect to the disclosed apparatus. In especially preferred embodiments, the various servers, systems, databases, or interfaces exchange data using standardized protocols or algorithms, possibly based on HTTP, HTTPS, AES, public-private key exchanges, web service APIs, known financial transaction protocols, or other electronic information exchanging methods. Data exchanges preferably are conducted over a packet-switched network, the Internet, LAN, WAN, VPN, or other type of packet switched network.

As used herein, the term "personal companion" refers to the entire system as viewed from the perspective of an individual user. Thus, there can be aspects of multiple personal companions that share resources at distally operated system (distal service) 360. From time to time herein, reference is made to a local portions of the system, which refers to portions of the system worn or otherwise carried by an individual user.

Figure 3B:
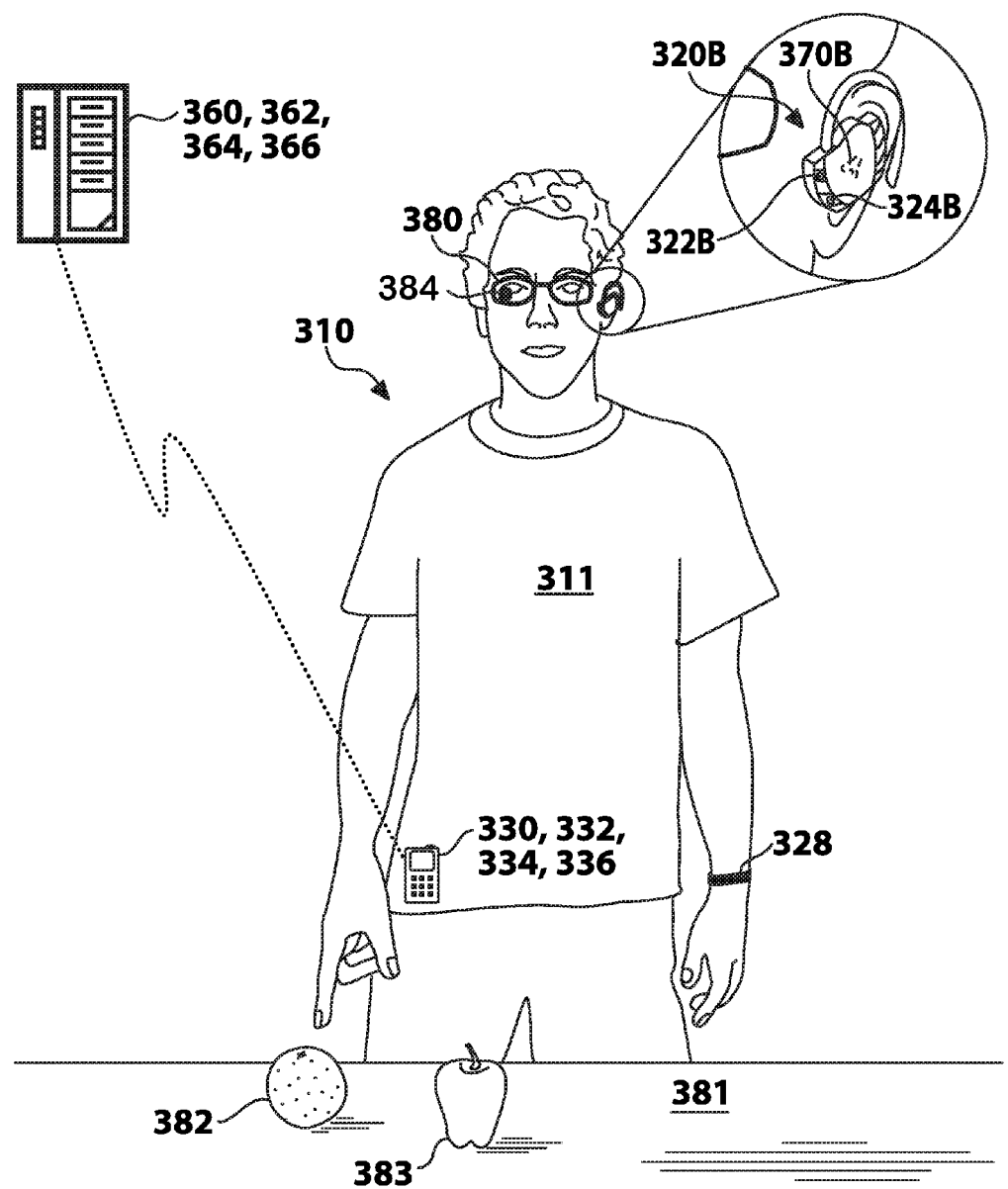
FIG. 3B is a schematic of a person using a personal companion, where the camera is included in a sensor module worn as an earpiece.

FIG. 3B is similar to FIG. 3A, except that the personal companion 300B has a sensor module 320B worn as an earpiece, in a manner similar to how people currently wear Bluetooth headsets. In this instance sensor module 320B includes a camera 322B, a microphone 324B and a speaker 370B.

In FIGS. 3A/3B the camera 332A/332B receives images of a table 381, which supports an orange 382 and an apple 383. The images are sent to the electronics module 330, which relays at least portions of the image data to the distally operated system (distal service) 360. The distally operated system (distal service) 360 uses software 362 to identify visual features in whatever image data was received, and then apply those visual features against a crowd-sourced database to identify one or more objects within the image(s). As discussed in greater detail below, contemplated systems and methods can be used not only to identify objects, but also to identify actions, events, and thoughts.

Figure 4:
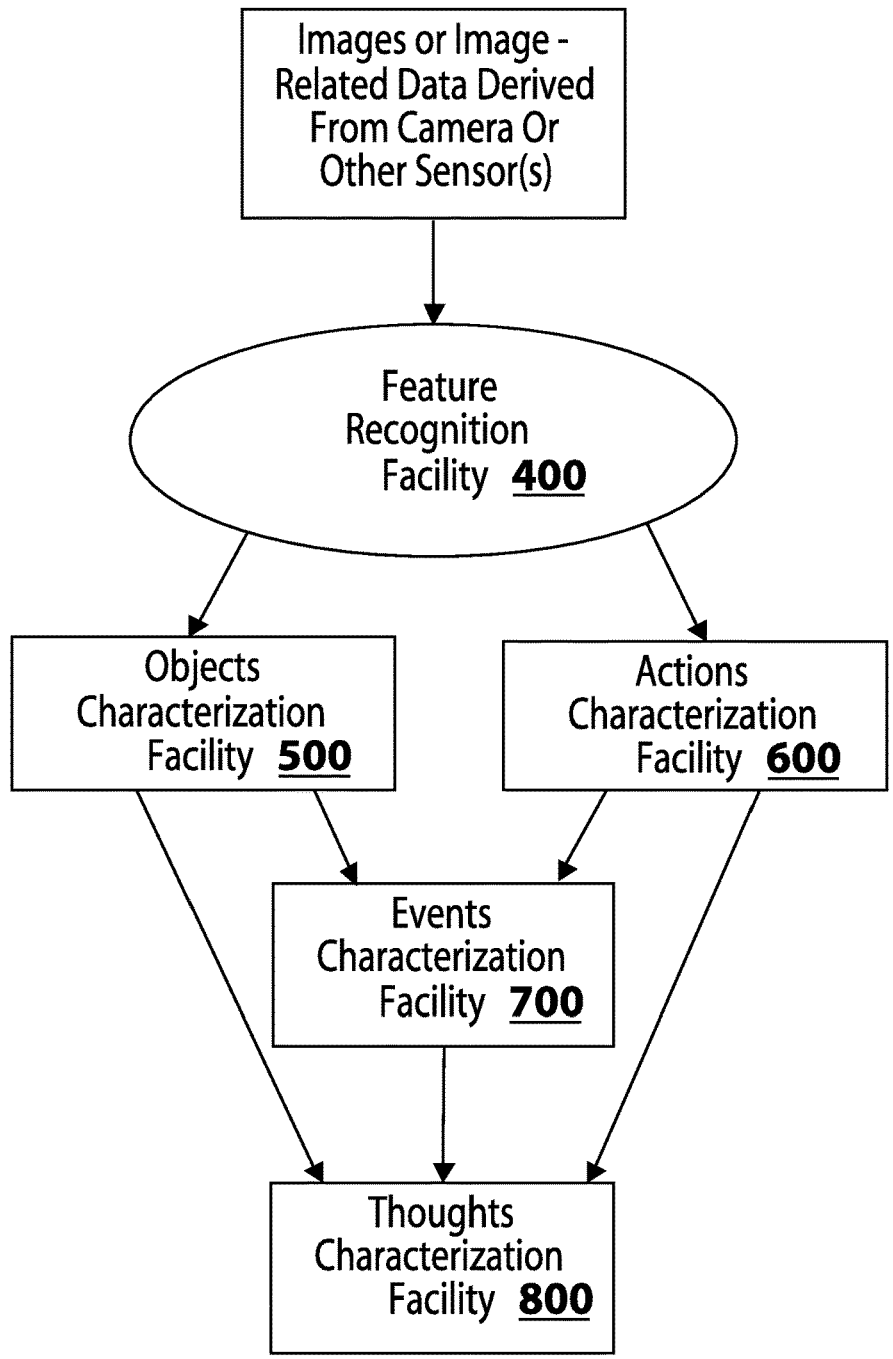
FIG. 4 is a schematic showing preferred correlations among image recognition and characterization facilities.

FIG. 4 depicts a high level overview of preferred correlations among data structures. Currently preferred embodiments use a feature recognition facility 400, an objects characterization facility 500, an actions characterization facility 600, an events characterization facility 700, and a thoughts facility 800. As used herein, the term "facility" means a physical device comprising electronics programmed or otherwise configured to (a) perform a desired function or (b) provide access to a device, system or service that performs the desired function. Facilities can be stand-alone, networked and/or implemented in cloud computing or other distributed environments.

Feature recognition facility 400 can use any suitable algorithms, software and/or hardware, and it is considered to be within the skill of ordinary persons in the art to implement feature recognition facility 400 using known products.

For example, identification of objects and visual features using image data can be accomplished using a Scale-Invariant Feature Transform (SIFT) or Speeded Up Robust Feature (SURF). Information on these technologies can be found at the corresponding Wikipedia articles, http://en.wikipedia.org/wiki/Scale-invariant_feature_transform and http://en.wikipedia.org/wiki/SURF, respectively. Such technologies are already used in conjunction with a single camera SLAM system. See for example, Active Vision Laboratory's web page at http://www.robots.ox.ac.uk/~bob/research/research_objectslam.html.

Identification of persons and facial features using facial recognition software products can be accomplished using products such as iOmniscient™ (see http://iomniscient.com/index.php?option=com_content&view=article&id=58&Itemid=54).

Identification of objects and features using sound data can also be accomplished with available software. For example, content of human speech can be recognized using Dragon™ NaturallySpeaking software from Nuance™ (see www.nuance.com), and birdsong, music and other non-speech sounds can be recognized using programs Raven™ (see www.birds.cornell.edu/brp/raven/ravenoverview.html).

Identification of objects and features using odor data can be accomplished using zNose™ from Electronic Sensor Technology, or the S&T™ (Smell and Taste) software from F&F Consulting (see http://www.fid-tech.com/eng/technol/data/electronics/1.449.html).

It should be appreciated that personal companions need not conduct image or sound recognition per se. that is, there is no necessarily any database of images against which a captured image is compared. Personal companions preferably store pattern characteristics and associate those patterns with objects, ideas, behaviors and other things. For example personal companions could store information that oranges are bumpy, orange colored, usually have no stem attached, and about the size of a fist. In that instance, determining that an object is an orange does not require image recognition software, but instead pattern recognition software, preferably using crowd sourcing of the patterns.

It is contemplated that at least some feature recognition could take place locally, to the extent permitted by the sophistication of the local hardware in electronics module 330. For example, the S&T™ system discussed above is specifically designed for use on cell phones or other mobile devices. Nevertheless, it is far more likely that feature recognition facility 400 will operate by the local hardware sending image, sound, odor or other data to a distal service for interpretation.

Outputs of the feature recognition facility 400 are preferably stored in database tables that correlate specific features with objects and actions. And unlike the prior art, such storage preferably takes place using crowd-sourced characterizations and parameters.

Objects characterization facility 500 is implemented in part in objects table 510 shown in FIGS. 5A and 5C, and an objects position-keys table 520 shown in FIG. 5B. The corresponding database manager(s), communications manager(s), hardware, etc can be located anywhere, including for example the electronics module 330 (FIGS. 3A and 3B) and the Canopy (FIG. 8), and those figures should be interpreted in that manner.

Objects table 510 is used to correlate names of objects, which could be things, people, animals, buildings, trees, toys, and so forth, with characteristics. In this particular example the first two columns $511_1$, $511_2$ are used for record number and position key, respectively, the third column $511_3$ is used for a name of the object, and the remaining columns $511_4$-$511_y$ are used for the characteristics. In this example, the data used for position key is the name of an object category (fruit, vehicle, person, animal, etc), which is used in conjunction with table 520 to interpret the data in some of the remaining columns.

Object table 510 could be very large, having many millions of records. For searching efficiency, however, object table could be split into many different tables. One way of doing that would be to have different tables for different object categories, e.g., a table for fruit, a table for vehicle, and a table for person.

Object position-keys table 520 uses the first two columns $521_1$, $521_2$ for record number and category, respectively, and the remaining columns $521_3$-$521_n$ for data that determines what information cells of a given record in the object table 510 will store.

From a linguistic perspective, one can think of objects table 510 as correlating nouns in column $511_3$ with corresponding adjectives in columns $511_4$-$511_y$ for a particular object. For example, the first record $512_1$ in objects table 510 correlates the noun "orange" with the adjectives "round", "orange" and "dimpled" in corresponding cells of columns $511_4$, $511_5$ and $511_6$. The first record $522_1$ in the objects position-keys table 520 correlates the adjective "round" with the category "shape", the adjective "orange" with the category "color", and the adjective "dimpled" with the category "texture".

The second record $512_2$ in the objects position-keys table 520 correlates the noun "truck" with the adjectives "monster", "white", "expensive", and "big wheels" The reader should note that the term "adjective" is used herein in a relatively broad sense to describe an aspect of the object, and the words or characters used to store that need not be grammatically correct in any particular language. Thus, the second record $512_2$ stores the words "big wheels", even though in English the correct adjective might be "big wheeled".

The reader will hopefully should notice that not all cells of every record need to be utilized. To the contrary, each of the various tables in this application will very likely have many cells with no data. Also, instead of including literals in the objects table 510, it should be appreciated that one could alternatively or additionally use an adjectives table (not shown) that would simply list adjectives, which could then be pointed to from objects table 510.

Object records can also store symbols. In records $512_7$ and $512_8$ the objects table 510 stores images of one of the Apple logos, and two different contexts in which that logo was found. Record $512_9$ stores a bar code for the xyz product, which was identified as being found on packaging. Record $512_{10}$ stores a QR code for Wikipedia, which was identified as being found on a t-shirt. Of particular interest is record $512_{11}$, included here to demonstrate that virtually anything can be used as a symbol. In this case the image of George Washington standing up in a boat is stored as a symbol.

FIG. 5C shows some of the columns of Table 510 that were not depicted in FIG. 5A because of space limitations. In this example, column $511_7$ identifies the personal companions (or perhaps that of users operating the personal companions) that provided the information in the record.

Column $511_8$ identifies the confidentiality level accorded the information in the record. Typically the default would be shareable, but users might instruct their personal companions to restrict the information to only the personal companion (or person), to family members, and so forth.

Column $511_9$ identifies a date or perhaps a date/time stamp in which the information was loaded or last updated.

Column $511_{10}$ identifies a date or perhaps a date/time stamp that the record will expire. A default might be for the record to never expire, or perhaps for some time period, such as 5 or 10 years from the load date.

Column $511_{11}$ identifies a weighting that should be applied to this record. This could be on any suitable scale, as for example 1 to 5, or 1 to 100. Weightings might correspond to the confidence that the person providing the information has with respect to the correlations in the records. For example, a person providing information might be almost completely sure that a given QR code is associated with a given product, but only 1% sure that a person standing up in a boat in a painting is George Washington. The weighting might be determined by a personal companion asking for a weighting, or in other instances by comparing one person's characterizations with those of others, giving relatively heavy weightings to characterizations upon which people tend to agree.

Column $511_{12}$ identifies a persona to which this record relates. Personas used in connection with crowd-sourced databases are described in another one of my patent applications, US2008/0097849 (Ramsaier et al., Publ April 2008). In the context of the current application, personas could be used to modify the weighting given to specific records depending on whether the persona for that record is consistent or inconsistent with the current persona. Current persona could be expressly told to one's personal companion, or more preferably inferred by place, people, etc, and could be stored in a User Preferences table such as row 8 of table 900 of FIG. 9.

Of course the data presented in all of the tables in this application are exemplary only, included to indicate the gist of the ideas presented herein. Similarly, although records and columns are depicted as having fixed lengths, which is currently thought to be desirable to provide quick processing speed, records and columns could instead have variable lengths, and indeed other structures besides flat tables could be used. One should also appreciate that even though the letters "n" and "m" are used repeatedly to designate the number of columns and records in multiple tables, the various tables can have, and almost certainly will have, different numbers of columns and records. Still further, the use of any particular logo in this application should not be construed as indicating any legal association with, or endorsement by, any entity associated with the logo.

It should also be appreciated that although the tables and other exemplifications herein use English language words, any language could be used, including non-phonetic languages such as Japanese, Mandarin and Korean. In addition, it is contemplated to use translation tables or other strategies to translate data from one language into another language.

In FIG. 6, actions characterization facility 600 generally includes an actions table 610 and an actions position-keys table 620, with the database manager, communications manager, hardware, etc not shown. Actions table 610 is used to correlate aspects of movements, walking, riding, driving, eating, speaking, flying, sinking, playing, and so forth, with names of the actions. In this particular example the first two columns $611_1$, $611_2$ used for record number and position key, respectively, the third column $611_3$ is used for the name of the action, and the remaining columns $611_3$-$611_n$ are used for other characterizations of the actions.

Action position-keys table 620 uses the first two columns $621_1$, $621_2$ for record number and category, respectively, and the remaining columns $621_3$-$621_n$ for data that determines what information cells of a given record in the action table 610 will store.

Actions table 610 should be interpreted as having corresponding columns for source identification, confidentiality, time stamps, weighting and personas as discussed with respect to FIG. 5C.

From a linguistic perspective, one can think of actions table 610 as correlating verbs in column $611_3$ with corresponding adverbs in columns $611_4$-$611_n$ for a particular action. In the example shown record $622_1$ is a key to interpreting data in records $611_1$ and $611_2$ in actions table 610, where speed is "fast" or "slowly" and "manner" is "recklessly" or "haltingly".

The reader may notice at this point that the categories depicted in the figures for different types of objects and actions are examples only, and are therefore somewhat arbitrary for the purpose of demonstration. Indeed, categories are intended to evolve over time depending on what users of the system tend to utilize. It may also be that some implementations use subcategories, or no categories at all for one or more of the objects characterization facility 500, actions characterization facility 600, events characterization facility 700, or thoughts facility 800. In other instances the category can be the same as the object, action, etc. See for example records $612_3$, and $612_4$ in FIG. 6.

One could alternatively or additionally use an adverbs table (not shown) that would simply list adverbs, which could then be pointed to in objects table 610.

In FIG. 7, events characterization facility 700 generally includes an events table 710 that correlates (a) objects from the objects table 510 with (b) actions from the actions table 610 and (c) outcomes. In this particular example the first two columns $711_1$, $711_2$ are used for record number and name of the event, respectively, and the remaining columns $711_4$-$711_n$ are used for characteristics of the events.

It is contemplated that one could use an events-position key table analogous to tables 520 and 620 for objects and events, respectively. But that is considered disadvantageous because it introduces unnecessary complexity.

From a linguistic perspective, one can think of actions table 710 as a collection of stored sentences, where the data in cells of the various columns correspond to the subjects, verbs, objects, and other parts of speech. For example:

In events record no. 1, the observation that "Martha Smith reads" is recorded as Martha Smith (object record 5) reads (action record 5).

In events record no. 2, Martha Smith (object record 5) reads (action record 5) a Harry Potter book (object record 6).

In events record no. 3 Martha Smith (object record 5) reads (action record 3) a Harry Potter book (object record 6) to an unknown young adult male (object record 3).

In events record no 4., the unknown young adult male (object record 2) is walking a labrador dog (object record 4), with an outcome that someone (perhaps someone identified in a column of the table that is not visible), is "happy". Here the literal "happy" is inserted into the table, but one could have an adjectives table as discussed above (not shown), and record only links to the adjectives. One could also describe outcomes in terms of adverbs, and include either literals of the adverbs, or use links to an adverbs in an adverbs table (not shown).

The system could be made more complicated than simply using nouns, adjective, verb and adverbs. For example, in table 710, column 711₆ is used for preposition objects.

The terms "events" and "outcomes" should be construed herein in a sufficiently broad manner to include correlations of symbols with objects, actions, events, and thoughts. Links are considered addresses of data objects. In record 712₆, for example, one of the Apple logos is associated with an outcome of linking to the main web page URL for the Apple company. Similarly, a hypothetical bar code for XYZ company is associated with a link to its website, and a Wikipedia QR code is associated with a link to its website.

Of course, since this is a bottom-up, self evolving database, individuals can make whatever associations they desire. To demonstrate that aspect, the hypothetical bar code for XYZ company is also associated with a link to a competitor's ABC website. Similarly, the image of George Washington standing in a boat is stored as a symbol that represents multiple different things, a concept (pride in America), a historical event (revolutionary war), a web page, and a book, *Washington: A Life*, by Ron Chernow).

Thoughts can be handled in a manner analogous to events, with the main difference that thoughts are not necessarily correlated with specific real-life events. For example, whereas Table 710 of FIG. 7 might store information about a specific accident, a record of a thoughts table (not shown) might store the generalization that a car (noun) moving (verb) fast (adverb) and erratically (adverb) tends to result in accidents (outcome). Another record might store the generalization that music (noun) played (verb) loudly (adverb) over a long time (adverb) tends to result in deafness (outcome). A third example is that a record could store the generalization that regular (adverb) flossing (verb) tends to result in gum disease (outcome).

It is contemplated that generalizations or other thoughts could be stored more or less directly from parsing of communications with users, and/or result from automatic review of records in events table(s).

Real-World, Virtual World, and Mixed-Realities

FIGS. 3A and 3B should be interpreted as exemplifying any of real-world, virtual or mixed-reality environments. Thus, the orange 382 and apple 383 could be real or virtual, and independently the person 310 could be real or virtual. As used herein, the term mixed-reality should be interpreted to include augmented reality. Similarly, the tables shown in FIGS. 5A, 5B, 6 and 7 should all be construed as storing information that can have any combination of real-world, virtual or mixed-reality components.

Examples of Crowd-Sourcing/Sharing of Parameters and Identifications

Hopefully, one can now understand how the apparatus of FIGS. 3 through 8 can implement step 32C of FIG. 2. In a preferred embodiment, a person wears or carries equipment such as the camera 322, microphone 324, electronics module 330, and speaker 370 of FIG. 3. The camera images some object, as for example, orange 382. The image, or at least data derived from the image, is sent to feature recognition facility 400, which either identifies the object as an orange, or identifies features (round, shaped, smallish, orange) from which other software can associate the object with an orange. Unlike the prior art, however, where a company has trained an image recognition facility to identify all such objects as oranges in a top-down manner, the training here is contemplated to be accomplished by multiple users. Thus, upon first encountering an orange by any of the users, the system and user might use microphone 324 and speaker 370 to engage in a dialogue as follows:

System—What is this?
User—An orange.
System—How do you know?
User—It's round and orange and dimpled.
System—What kind of object is it?
User—It's a fruit.

That data would be entered into a table such as objects table 510, as shown in row 512₁. If the system didn't already know that the adjective "round" referred to a shape, or that "red" referred to a color, the system might initiate a dialogue such as the following:

System—What sort of characteristic is "round"?
User—Round is a shape.
System—What sort of characteristic is "orange"?
User—Orange is a color.
System—What sort of characteristic is "dimpled"?
User—Dimpled is a texture.

That data could be stored in a record such as 522₁ of table 520. Of course, as time went on, the system would learn the words of characteristics, objects, and so forth. One key is that the image recognition facility is trained in a crowd-sourced and/or crowd-shared manner. Another key is that the image recognition facility identifies both object names (e.g., the name "orange"), characteristics (e.g., round, orange, dimpled), and parameters (e.g., shape, color, texture, etc).

Readers will appreciate that analysis of the words spoken by the user, and generation of queries and comments by the system would likely utilize at least rudimentary language parsing and creation facilities, preferably ones that consider both syntax and semantics. Such facilities are known in the prior art, and are not by themselves considered to be inventive herein.

In the case of actions, the image recognition facility would identify actions such as "walking" and "riding", and also identify characteristics of those actions, including for example, speed. That information would be stored in tables such as 610 and 620. An exemplary dialogue might take place as follows:

System—What is the boy doing?
User—He is standing.
System—How do you know?
User—His feet are on the ground.
System—How is he standing?
User—Quietly.

Events can be stored in an analogous manner, using a table such as table 710 of FIG. 7. To store that information, an exemplary dialogue might take place as follows:

System—What is happening?
User—Martha Smith is reading a book.

Assuming the system could already recognize Martha Smith, the activity of reading, and the object as a book, the system might store the information as in record 712₂ of table 710.

Readers might be skeptical that objects, actions, and events can be characterized with only a handful of characteristics sourced by question and answer interactions. But upon reflection, readers should appreciate that the process is analogous to how items, actions, events and thoughts can be characterized in the old twenty questions guessing game ("Is it bigger than a bread box?").

Crowd-Sourcing/Sharing of Additional Information

Element 42C of FIG. 2 refers to crowd-sourcing/sharing of additional information. In a crowd-sourced example, a person might say to his personal companion something along the lines of "This ornament breaks easily", or the personal companion might see the user break the ornament with little or no provocation. The characterization of breaking easily would be uploaded to the canopy, and made available to others. In a crowd-shared example, the personal companion of another person would see that the other person had picked up one of the ornaments in a store, and based upon passively received characterizations of others, the personal companion might say to the user "Be careful. That ornament breaks easily".

FIG. 7 provides a specific example of how the characterizations could be stored. There, outcomes in column n are, or provide links to, the additional information. For example, in record 712$_7$, the XYZ barcode is associated with a link to the URL for the XYZ company, and may well have been added to the system by an employee for the XYZ company. The association of the XYZ barcode with a competing company in record 712$_8$, or with the literal "breaks easily" in record 712$_{14}$, however, would have almost certainly been added to the system by someone else.

In another crowd-sourced example of obtaining additional information, a user might say to his personal companion, "Please tell others that the route 5 freeway is jammed at Katella", or the personal companion might see that the traffic jam using its camera. If that information is made generally available to others, then the personal companion of another person might passively receive the information, see that its person was about to enter the freeway, and say something along the lines of "Are you sure you want to go this way? The freeway is jammed at Katella."

It is important to note that although most of the examples herein are focused on deriving information from a microphone, camera or other sensor carried by a person, information could also be crowd-sourced/shared from stored materials, including for example Internet web pages, and county or other government records. For example, comments about a particular product could be crowd-sourced from blogs discussing the product. Thus, it is contemplated that a web crawler could be used to scour the Internet for information, using the canopy to provide context and suggestions as to how to characterize the information it finds, to establish links, and possibly even to conduct or take part in transactions.

Crowd-Sourcing/Sharing of Transactions

Element 52C of FIG. 2 refers to transactions, which can be accomplished in a crowd-sourced or crowd shared manner.

In a crowd-sourced example, a person might ask his personal companion to find out whether any others are interested in purchasing a monster truck. And example of how this could be recorded is in FIG. 7. There, record 712$_{15}$, in association with object record 510$_2$ and action record 610$_6$, shows an opportunity for 10 people to cooperate to each purchase a monster truck for $88,000. Many other examples are contemplated, including those where multiple individuals collectively purchase the same object, or perhaps collectively fund development of a company, commercialization of an invention, and so forth.

In a crowd-shared example, a personal companion might see that its person's vehicle is getting old, has high mileage, and is starting to break down. The personal companion might also have recorded oohs and ahs when the person viewed monster trucks. Based on those correlations, and correlations from that person or others that a new item is often purchased when an old item is wearing out, the personal companion might mention to its person that a given vehicle is available, or that others are banding together to make a multi-vehicle purchase. The personal companion would have known about the opportunity because it passively received that information from the personal companions of others, possibly funneled through a canopy.

In another situation, if a group of friends were planning a vacation together, and three of the friends just bought airline tickets, that information would be made available to a fourth friend in a crowd-sourced or crowd-shared process as discussed above. In a crowd-sourced aspect of a transaction, a person might ask his personal companion "What's going on with the vacation? If others purchased tickets, then please purchase one for me." Or perhaps a person might say to his personal companion "Tell the others that I already bought the tickets."

In a crowd-sourced example of the transaction, a personal companion might tell its person "Three others bought tickets already. You should buy one too." Here again he personal companion would have known about the opportunity because it passively received that information from the personal companions of others, possibly funneled through a canopy. The personal companion might even not say anything to its person, and simply purchase a ticket.

Since personal companions can be context-aware, such interactions would preferably occur during an appropriate moment for the person, or perhaps triggered by something in the person's environment, such as a quiet moment, or perhaps when the person is looking at his calendar.

Storing Characterizations in the Canopy

Element 62C of FIG. 2 refers to storing characterizations in the canopy. This refers to the fact that records in the various tables can be generated by many different people, and yet everyone can have access to them. Although not readily apparent in this application, the ellipsis indicating other columns in the various table should be read to include, among other things, indicators of the source of the data, a time/date stamp, geographic location, social groups, and privacy indicators. In that manner the system can weight correlations properly to different users.

For example, an events table such as table 710 could store many instances of different people correlating the XYZ barcode or logo with Internet links and comment literals. Most or all of those correlations would be made available to everyone, and would preferably be weighted according to frequency, time/date stamp and so forth. Those associations would remain, as part of the canopy, at least during their various decay periods, even if the persons storing them died, or otherwise stopped using the system.

It is contemplated, however, that associations would be weighted. Weighting could be done in any suitable manner, but would preferably reflect who made the associations, how old the associations were, and the frequency with which a given association was made. Thus, associations made one day ago would be given greater weight those made a year ago, and associations made by hundreds of people would be given greater weight than those made by only one or two people. Also, associations made by a given individual would preferably be given greater weight for that individual than for others. This is how an apple to most people could be considered an apple, but the same apple to a produce manager might be considered a Macintosh.

Figure 8:
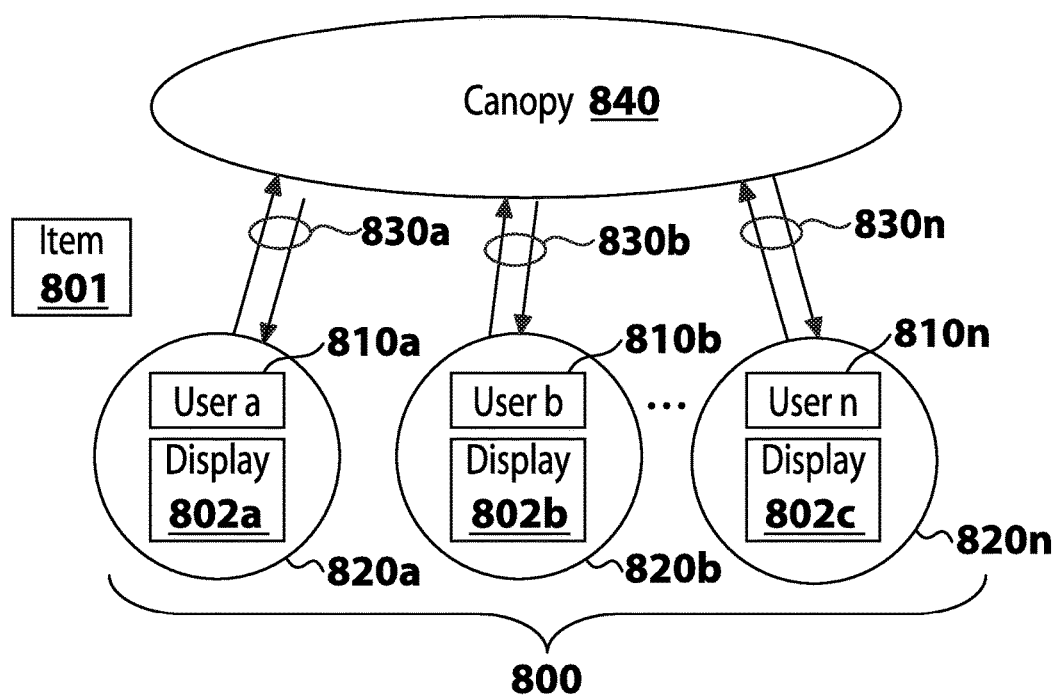
FIG. 8 is a schematic of several people interacting through their personal companions with a canopy and with each other.

FIG. 8 depicts a thoughts facility 800 in which multiple users 810a-810n of personal companions 820a-820n, and their connections 830a-830n with a processing network 840, all in accordance with the canopy concept discussed above. At any point in time some of the personal companions will likely be passively observing their local environments, using previously crowd-sourced information to derive characterizations from those environments, but not interacting with their corresponding users at all. Other personal companions will likely be interacting with their corresponding users (sometimes in a question and answer mode), in effect training the system to crowd-source how objects, actions, events and thoughts should be abstracted, both in the present and in the future. Others will likely be using the data and/or characterizations from other personal companions, in a crowd-shared manner that does not require any action from their corresponding users to receive the information. Still others will likely be interacting with their corresponding users, making suggestions, providing warnings, and so forth, based upon characterizations about the their past or contemporaneous local environments, past or contemporaneous interactions with their users, and data and characterizations of others. All of that can be based at least in part on data and characterizations stored in the canopy.

As indicated elsewhere, depending on memory, computer power, and so forth, none, some or all of the steps listed above (recording, abstracting, and providing circumstance-relevant information) for any given personal companion can be accomplished locally, with the remainder accomplished distally (e.g., by a distal server or network), or even by recruiting processing power from other personal companions.

From the perspective of a given one of the users, thoughts facility 800 should be interpreted as comprising software operable by a user 810a in cooperation with a device 820a having a portable housing, within which is contained electronics configured by the software to: receive ambient data corresponding to an item 801 within an environment of the user 810a; and utilize (a) information derived from the ambient data and (b) an audible, at least partially computer generated, conversation with the person to assist in identifying the item.

Device 820a can be and/or include a cell phone, or at least sufficient electronics to conduct a phone call, and in other aspects can comprise a personal companion such as 300A in FIG. 3A or 300B of FIG. 3B.

The item can be a car, person, animal, building, coffee cup, or substantially any cognizable physical object, in the real world, a virtual world or a mixed reality world. Thus, for example, the item could comprise an electronic rendering of an object, such as an image on a TV screen or other electronic display.

The ambient data can include image data produced by a CCD, CMOS or other image sensor, and since the image sensor can be remote from the housing of the electronics, the ambient data can include image data received from a source external to the housing. Ambient data can additionally or alternatively include sound, biometric, olfactory or other types of data.

The electronics of device 820a is preferably configured to send information derived from the ambient data to a service distal (part of canopy 840) from the device. The information sent from the device 820a can comprise at least a portion of the ambient data, a matrix manipulation or other derivation of at least a portion of the ambient data, and/or textual or other characterizations of the ambient data. Characterizations could, for example, include color, size, movement, relative position, type of object (e.g. face), loudness, or rhythm. Additionally or alternatively, the information sent from device 820a could comprise a Scale-Invariant Feature Transform (SIFT), Speeded Up Robust Feature (SURF), or other non-textual characterization of a feature of at least a portion of the object.

The electronics of device 820a can further be configured to receive a proposed identification from the distal service, and to relate the proposed identification to the person as part of the audible conversation. Sending and or receiving herein can be accomplished directly, by point to point communications, or indirectly via intermediate points. Relating of the proposed identification can occur in any suitable manner including for example, stating or suggesting.

The electronics of device 820a can further be configured to receive an address from the distal service, and to obtain additional information about the item by contacting the address. All manner of physical and electronic addresses are contemplated, including for example, a telephone number, an email address, a SMS address, and a social networking address. Similarly, all manner of additional information are contemplated, including for example, price, availability, options, physical characteristics, and consumer comments.

The electronics of device 820a can further be configured to receive a comment from the distal service, and render the comment as part of the audible conversation.

Device 820a can optionally include a screen, projector or other display apparatus 802a, and where the electronics is configured to receive image data from the distal service, the device can render the image data using the display apparatus.

The electronics of device 820a can further be configured to receive a command from the distal service, and to use the command to operate one of the other personal companions, or another device as for example a television, radio or a 3D printer.

The audible conversation can be of any practical length, but preferably includes a sequence of at least a first second utterance by the person, a first computer generated utterance, a second utterance by the person, and a second computer generated utterance.

The electronics of device 820a can further be configured to utilize a database (as for example in the canopy) to provide a characterization of the item, wherein the database associates parameters with values, and at least some of the parameters are crowd-sourced or crowd-shared, and/or where data within the database is crowd-shared.

Devices 820b through 820n should be thought of a similar to device 820a, and for example, could have corresponding display apparatus 802b through 802n.

Another set of novel concepts herein involves a personal companion or other electronic device being programmed to make use of an item of stored information on behalf of its user in a manner that requires no affirmative action by the user.

This could be accomplished further to the electronic device soliciting information from its user using an audible human-understandable conversation that includes at least some computer-generated speech, communicating the solicited information for storage in a hardware-based data structure; and obtaining the item of information from the data structure. In some embodiments the obtained item will be derived from (1) at least some of the solicited information and (2) other information solicited by, and uploaded to, the data structure by another person's electronic device.

The solicited information could comprises raw data and/or one or more characterizations of raw data.

There are many ways in which stored information can be used by a personal companion or other electronic device on behalf of its user person, in a manner that requires no affirmative action by the user. For example, the personal companion could use the stored information to recognize at least one of an object, an action and an event, in an environment about the person. Another contemplated use is for the electronic device to refrain from saying something in response to the personal companion recognizing at least one of an object, an action and an event, in an environment about the person. Other contemplated uses are for the electronic device to send an operating command to a piece of equipment, or perhaps an email or other form of communication to a person or other entity. Another contemplated use is for the electronic device to make a purchase, or conduct some other transaction, especially a transaction involving money.

Uploading, Storage and Deletion of Data

An events table such as table 710 could store millions of instances of different people seeing various fruits, or even many instances of the same person seeing a particular fruit. Most or all of those instances have no significance whatsoever, and should not waste space in storage. To facilitate that deletion function, it is contemplated that raw data, such as raw video or other image, audio, and biometric data will be saved for only a relatively short period of time, such as a few minutes or perhaps a few hours. The particular amount of time that raw data is saved is preferably controlled by the person wearing the local portions of the system, by the amount of local memory, by connectivity to Internet or upload path(s), and so forth. It is, however, also contemplated that the local portion of the system could upload raw data, so that, for example, the raw data of a audio/video clip of a car accident, or perhaps a particularly interesting portion of a sporting event, could be saved and shared with others.

Ideally, the local portion of the system, e.g., networkable electronics module 330, would have enough processing power and memory to store characterizations in local portions of the various characterization facility tables, such that for the most part only characterizations are sent to any distal facility for merging with characterizations of others. Records in both local and distal facilities are preferably subject to deletion based upon suitable factors, including for example redundancy and a date/time stamp. Where generalization or other thoughts records are abstracted from collections of events records, it is contemplated that at least some of the underlying events records can be deleted.

Persistency and Background Operation

One aspect of the inventive subject matter is that personal companions can have a high degree of persistency. In preferred embodiments a person's personal companion is active for at least 50%, 60%, 70%, 80% or even up to 100% of that person's waking day. It basically records a significant portion of the person's life, the sights that the person would see and the sounds that the person would hear. The personal sensor module would thus typically record encounters with friends and co-workers, driving experiences, cooking dinner, and so forth. Depending on the capability of the camera and microphone, the system could even record images and sounds outside of the person's native senses, such as ultraviolet or infrared light, or ultrasonic sounds. The networked electronics module could advantageously include a GPS or other geolocation facility, and record the person's location on an ongoing basis.

One advantage of both persistency and background operation is that information could be collected from many different people, and not only be almost immediately available to others, but actually be used by others without anyone intentionally storing or retrieving the information. For example, in the prior art it is known that a driver driving along a freeway might see that the road is jammed up with traffic, and post an image or video of the traffic jam to Facebook™, or send information regarding the traffic jam to Waze™ or Twitter™. Thirty people might see that post, and five write back with thanks for the warning. All of that, however, takes conscious effort on the part of those involved.

In contrast, a contemplated personal companion could have a camera that would persistently and automatically observe everything in its view, including the traffic. In preferred embodiments there is no need to repeatedly "point and click" or take other affirmative actions to capture data. The system could automatically abstract that the congestion constitutes a traffic jam, and upload that abstraction (perhaps along with still images or video) to the collective events facility. The personal companions of some others could also have observed their surroundings and actions, and might have generalized that they are about to take that same freeway, and would likely hit the same traffic jam. Their personal companions could then warn them, saying something along the lines of "The 57 freeway is jammed at Anaheim stadium." Thus, unlike the prior art, the personal companion observations can be persistent, and abstraction, sharing and application of those observations can all be automatic.

Speed of Operation

It is contemplated that personal companions could provide near-contemporaneous characterization and/or abstraction of observed information. As used herein, the term "near-contemporaneous characterization and/or abstraction of observed information" with respect to a feature, object, action, or an event condition means that the characterization and/or abstraction takes place within 15 minutes of the sensor sensing the feature, object, action, or event being characterized or abstracted. As used herein, the term "contemporaneous characterization and/or abstraction of observed information" with respect to a feature, object, action, or an event condition means that the characterization and/or abstraction takes place within 5 minutes of the sensor sensing the feature, object, action, or event being characterized or abstracted. These terms are intended thereby to be distinguished from concurrent, simultaneous, coincident, and real-time, which are referred to herein as occurring within than five seconds of an occurrence.

Providing Information from Multiple Sources

It is contemplated that personal companions could associate locally derived information with information from any other available source or sources, including for example, information available on the Internet, identity of nearby business associates or personal friends, and information from books, blogs and other Internet sources. Thus, if a person asked for driving directions, the system might generate a query, which is then submitted to Google.com, Yahoo.com, Ask.com or Bing.com to determine the answer. One benefit of accessing search engines using a person companion is that the returned information could be stripped of advertising, and/or could be re-ranked according to according to individual's preferences and history.

The concept of asking a question or stating a command in natural language, and sending the question or command to a distal service to retrieve an answer or operate a device, has recently been embodied in Apple's Siri™. But those concepts were disclosed much earlier in the priority filing, PCT/US00/25613 to what is now US issued '867 patent, and pending applications US2012/0178432 (Fish, Publ July 2012), US2012/0179452 (Fish, Publ July 2012), US2012/0208600 (Fish, Publ August 2012) and US2012/0231843 (Fish, Publ September 2012).

It is contemplated that information stored by personal companions, whether raw data or characterizations, could be automatically posted to social networking and/or other sites. And personal companions might also monitor websites and other resources in the background, observing and abstracting from those resources.

Other Aspects of the Inventive Subject Matter

The following paragraphs describe some specific contemplated aspects of personal companions. Unless the context requires a contrary interpretation, each of the other aspects should be interpreted as capable of being independently implemented. Thus, even where a sentence says that a personal companion could do "x", and the next sentence says a personal companion could also do "y", the reader should interpret "x" and "y" as being independently implementable, not that the personal companion need do both "x" and "y".

It should also be appreciated that each of the other aspects could be implemented along with one, or independently of crowd-sourcing and/or crowd-sharing.

Inconsistent or Incorrect Information

The use of self-evolving databases contemplated herein will naturally tend to store information that is inconsistent and/or incorrect. In addition, personal companions should be able to relearn or correct previous learning. For example, if a personal companion confuses dogs and cats, because both are furry mammals with tails and four legs, a user should be able to talk back and forth with his personal companion to add distinguishing features. Or if a personal companion is storing data the correlates particular characteristics with the name Mary, when in fact those characteristics refer to Jane, a user should be able to tell his personal companion to replace the name Mary with the name Jane. Still further, if a personal companion has stored characterizations, whether from its user or from others, that a poisonous plant is safe to eat, a user should be able to insist that his personal companion identifies that plant as poisonous. This can be accomplished using a weighting factor in the database for this particular user (see e.g., column $511_{11}$ in FIG. 5C).

Another consequence of using self-evolving databases as contemplated herein is that such databases can accommodate nuanced views of different users. For example, most people would view a supermarket orange as just an orange. But the produce manager would likely distinguish among a Valencia orange, a navel orange, and a blood orange. In another example, one person might view a plastic orange as an orange, while another might view it as a toy or a prop. Some people might characterize a book a being "fantastic" while another might characterize it as "awful". And indeed, it may be that someone instructs his/her personal computer that a car is called a bicycle. Preferred apparatus, systems and methods herein can accommodate all of those situations because each personal companion could have its own data tables, and where records from multiple personal companions are stored together, the tables can include a source identifier (e.g. column $511_7$ of FIG. 5C).

Privacy

Users likely won't want the local instances of their personal companions to be observing their environment all the time. Among other things, users might want privacy in their homes, and might want to avoid recording images of copyright subject matter. It is contemplated therefore that local instances of personal companions, or at least one or more sensors of the personal companions, could be place into a sleep mode. This could be done, for example, by expressly telling a personal companion to go to sleep, or by pushing a button on the electronics module 330. Another option is for a user to tell his personal companion to sleep automatically, such as when the personal companion perceives the event of "getting into bed", see row $612_9$ of FIG. 610 or between 9 pm and 6 am. Such preferences could be kept in a User Preferences table (see row 1 of table 900 FIG. 9), and could all be triggered by perception of objects corresponding to rows in table 510 and/or events corresponding to rows in table 610.

In some instances the user might want his personal companion to "wake up" after a given period of time, or perhaps upon sensing a keyword, sound or motion. In other instances, a user might want a sensor to be awake, but the local instance of their personal companion to preclude uploads or retrievals. Alternatively the user might want the personal companion to retrieve information, but to remain silent. These preferences could all be kept in a User Preferences table (see row 2 of table 900 of FIG. 9), and could all be triggered by perception of objects corresponding to rows in table 510 and/or events corresponding to rows in table 610.

In other instances personal companions could be programmed to anonymize information. That could be accomplished in many ways, including expressly instructing a personal companion to upload raw data and observations to the canopy without source identification tags, or uploading with a code that instructs the canopy to delete any uploaded source identification tags. For example, records in table 510 or 610 could be loaded with source identification data (see e.g. column $511_7$ in FIG. 5C) blocked out. In addition, a personal companion could provide assurances to its user that private data about their habits, day-to-day activities, personal thoughts, opinions, etc. cannot be traced back to them.

Dealing with Different Users

Based upon previous questions and answers with its user, a personal companion could automatically implement various preferences. For example, a personal companion could activate a blackout coating on its camera, or stop recording image and/or audio data at night, or during a movie. (See above discussion re privacy). As another example, one person's personal companion might focus on automobiles, abstracting what types and years of automobiles were viewed during the day, while another person's personal companion might substantially ignore automobiles and instead focus on identifying people he meets during the day. This can all be accommodated by personal companions each having their own data tables as discussed above, and where records from multiple personal companions are stored together, the tables can include a source identifier (e.g. column $511_7$ of FIG. 5C).

Focus could additionally or alternatively be implemented in a User Preferences table, as in row 3 of table 900 of FIG. 9, where various focuses include fruit, friends, co-workers, and events characterized as danger. The ellipses in column 6 should be interpreted as indicating that the table can have more than just seven columns. Another possibility for focus is that a user might instruct his personal companion to interpret the signs along a roadway, and notify the user when a certain exit is coming up, or perhaps when the speed limit changes.

Different personal companions could interact with their users according to different personality traits. Thus, one personal companion might interact in a strict manner, while another personal companion might interact in a very warm, kind manner. A personal companion might also change the way it interacts depending on circumstance, so that in a situation that is perceived as being dangerous, the personal companion interacts in a very terse, quick spoken manner, but while reading on a blanket at the beach, the same personal companion might interact in a slower, more lyrical manner. Similarly, personal companions could adjust the language (e.g. from Spanish to English) or the speech level (from adult to child) depending on the perceived characteristics of the person being spoken to. For example, a personal companion could be instructed to provide an infant with appropriate music or sounds in a caretaker mode, and an adult with adult music. Such preferences could be implemented using a User Preferences table, as in rows 4 and 5 of table 900 of FIG. 9 where Interaction Level is adult, and Language is English.

It is further contemplated that personal companions could have restrictions that accommodate demographics, preferences, or sensibilities of the users. For example, there could be a kids version that restricts the type of information, websites, etc., that can be accessed by a child user. As an example, personal companions could be instructed to automatically filter out adult images or other types of information.

Personal companions could also be designed to utilize an inside or outside service to effect translations from one language to another. Such preferences could be implemented using a User Preferences table, as in row 6 of table 900 of FIG. 9 where Translation Service is recorded as Google Translator.

Initializing a Personal Companion

Personal companions do not have to start from scratch. When a person buys a new personal companion, and uses it for the first time, it could already benefit from characterizations, preferences and so forth stored in the canopy, or otherwise previously stored by other users. The new personal companion could, for example, start out with records from other users that have the same Interaction Level and Language, and one or more of the same focuses. See User Preferences table, rows 4 and 5 of table 900 of FIG. 9.

Moreover, it might be very useful during initial setup or later modification for a personal companion to guide its user as to preferences by asking about preferences utilized by others. For example, a personal companion might say something along the lines of "Many other users have reminders to do something upon leaving the house. Do you want to set a similar reminder?"

Monitoring

A personal companion could monitor a child, older person or indeed anyone for signs of sickness, and report back with crowd-sourced phrases such as "She looks flushed", or "She stopped breathing" based upon matching up perceived characteristics with crowd-sourced characteristics. Such characterizations could be maintained in the appropriate tables, e.g., objects table for "She looks flushed", and an actions table for "She stopped breathing". Personal companions could also monitor a child for some other condition, such as happiness or sleepiness.

A personal companion could similarly be used to monitor what goes on in a child's life at school, or at a park, or during a social interaction. In that case the parent's personal companion could direct the child's personal companion to look for certain things, and report back in specified ways, such as through the canopy, or perhaps directly by placing a phone call or sending an email. See for example, row 7 in the User Preferences table in FIG. 9.

A personal companion could also monitor a non-human object for some relevant condition, including for example, water overflowing from a bathtub, a stove being left on, a garage door being left open, or a package being left at the front door.

A personal companion could be used to record ideas, such as when a person is talking out load while taking a walk or driving a car. In such instances the user might expressly instruct the personal companion to retain raw data of audio and/or video for the next x minutes, or until further notice. The user might also specify that the personal companion should send the audio to a local device or service to be rendered as text.

A personal companion could also assist in short term or long term memory enhancement. For example, in cases where a user missed hearing something important in a conversation, or on TV or the radio, he could ask his personal companion "What did he say?"

A personal companion could be used to read pre-recorded text, such as that from an email, or a book. See for example, row 9 in the User Preferences table 900 in FIG. 9.

Even though preferred personal companions would likely be used to acquire data in a persistent or continuous manner, it is contemplated that they could instead, or from time to time, acquire data in an occasional or frequent manner. As used herein, the term "occasional" means that something occurs or is sampled at a rate of at least once a week, or at least a cumulative 2% of the time over a one day period. In contrast, the term "frequent" as used herein means that something occurs or is sampled at a rate of at least once a day during a five day period, or at least a cumulative 10% of the time over a one day period.

Most or all of personal companion interactions could be time shifted rather than done in real time or near real time. For example, one could retrospectively process input from a personal companion or even a simple wearable camera, to abstract and identify objects and events experienced on a skiing run. Where the camera was not part of a personal companion, the video could be fed to the personal companion, and then processed after the event by conversing with the personal companion. Similarly, at a conference where a camera is not appropriate, a personal companion could be used to record the live commentary, and interact with a user after later in the day. Where a personal companion is not available during the conference, a simple microphone and recording device could be used to record the commentary, which could later be analyzed using a personal companion.

Helping with Day to Day Tasks

A personal companion could couch individuals in memorizing a poem, a story, speech and so forth. It could listen to its user talk, compare the language with a correct or at least a preferred version, and then report back with crowd-sourced phrases such as "That was really good", or "That still needs a lot more work" based upon matching up characteristics such as accuracy, speed, clarity, and so forth.

A personal companion could remind a user, or someone else to follow certain protocols, such as putting on a seat belt, taking off shoes when coming into the house or going upstairs, or taking vitamins or prescription drugs.

A person companion could assist fashion-challenged or color blind user with matching colors on clothes, or choosing wall paper or paints.

Aspects of Physical Devices

A person companion could have multiple cameras pointing in different directions, for example a back facing camera so that a user can be warned when he is about to step into a dangerous area, or about to sit on a whoopee cushion. Multiple cameras could also provide an extremely good stereo perspective, with better distance resolution than human eyes. Cameras could also capture images using wide angle, zoom and other views. Cameras could also have filters for different frequency bands, and could detect ultra-violet, infra-red or other frequencies outside human perception.

A person companion could have multiple microphones to assist in detecting the direction from which a sound is coming, or to zoom in on specific speech or other sound. Here again, data from microphones could be filtered for different frequencies, and could be used to detect frequencies outside of human hearing range.

As pointed out above, personal companions could be intimately associated with a cell phone or other communication device, and could use that device to receive and/or make calls. Thus, for example, a personal companion could automatically get on the Internet to order flowers or a Christmas present based on an action preference (see e.g., row 13 of the User Preferences table 900 of FIG. 9). Similarly, a personal companion could automatically get on the phone to call for an ambulance based upon an event such as Perla fell and didn't get up. As yet another example, a movie star or other person might set his personal companion to automatically send out tweets with characterization of events during the last few hours, thereby creating another way of "following" a person. That could even be used by law enforcement, parents, or others to keep track of given individuals without completely intruding on their privacy.

Personal companions could be electronically, auditory or in some other manner coupled to mechanical or electronic effectors, such as automobiles, robots, wheelchairs and so forth. Thus, for example, if a personal companion characterized it's user as being drunk, it might prevent the user's car from starting. Such actions could be set as preferences, as for example in row 13 of User Preferences table 900 in FIG. 9. As another example, a personal companion could characterize it's user as too hot, and turn on a cooling fan.

Personal companions would preferably be worn in a manner that obscures their presence, or at least makes them non-obvious. Thus, for example, the sensor module 320A in FIG. 3A is made to appear as an ornamental pin.

Answering Specific Questions

Since personal companions inherently utilize crowd-sourcing to obtain information, they can readily be used to summarize what correlations others have made. For example, a user might ask his personal companion a question such as "How many people associate xyz product with breaking easily?" That would be simple query to put against a database table such as table 710 in FIG. 7 (see especially row 14), and could be enhanced using a semantic equivalence dictionary.

Since personal companions could persistently or even continuously characterize object and actions, they might well be able to answer questions such as "Where did I leave my watch?" or "Where is Julie"? That functionality could be especially facilitated by appropriate entries in a User Preferences table, such as row 11 of the table of table 900 of FIG. 9. As with other data in the User Preferences table, the designation to keep track of the wristwatch could most efficiently be entered into the table using a verbal question and answer exchange between the user and his personal companion.

Personal companions could also be of great assistance to people with faulty eyesight or hearing. For example, a blind person could pick up an orange, and ask his personal companion what it is. A deaf person might ask questions of his personal companion, and get the answers written out on a display screen.

Reminders

Although the world already has several excellent calendaring and reminder programs, one advantage of a personal companion is that it could be context-aware, and trigger reminders accordingly. For example, a personal companion might remind its user to turn out the lights, heat, air conditioning etc upon leaving the house. An example is in row 12 of the User Preferences table 900 of FIG. 9. As another example, a personal companion might ask its user if he wants to open the garage door when the user's car is about a block from home.

A personal companion could also remind its user of annual or monthly events, as for example birthdays or holidays. Prior art calendars can do that as well, but only if they are specifically instructed by the user or someone else to do so. A personal companion could infer what reminders to calendar, as for example by observing that there is a birthday around June 9 of every year.

Recommendations and Warnings

There are many systems currently in place that allow individuals to make recommendations to others. For example, many web sites solicit and make available recommendations regarding plumbers, doctors and other workers, many other sites that do similar thing with respect to restaurants, vacations, and so forth.

Personal companions can go one step further, by virtue of their being context-aware. Thus, if a person tells his personal companion that he is going to go to xyz restaurant, the personal companion could respond that the line there is at least a half hour, based upon observations of other personal companions of people standing in line. Then based on similar information in other restaurants, the personal companion might say "Would you consider going to ABC restaurant instead. The wait there is only 15 minutes."

A personal companion might also make a vacation recommendation, such as saying "Don't go to Julien today. It's too crowded and overcast" based on the user's prior characterizations of vacations as being "too crowded" or "overcast", and based upon crowd-sourced characterizations from other personal companions that are already in Julien.

Along similar lines, a personal computer might make purchase recommendations based on the characterizations of others. For example it might say "There are 20% negative characterizations of the xyz product, and 80 positive or neutral characterizations." As another example, a person shopping in a store might pick up a jar of peanut butter, only to have his personal companion say something along the lines of "52% of people characterized that product as being delicious", or "Ralphs is selling that same product today for $2.39."

Similarly, based upon its user characterizing many books as being "too hard", a personal companion might advise that a book being held by the user at a bookstore "has been characterized by many others as being too hard." A similar situation could exist with respect to a personal companion advising that a TV show or movie is "too violent" because others have made that characterization.

A personal companion could focus on recording and characterizing biometrics of its user, for example, blood pressure, heart rate, temperature, etc., and warn when they get out of whack. In a similar manner, a personal companion could recognize different colors of sputum or other body fluids, and/or interpret coughing sounds, and then ask appropriate questions regarding additional signs or symptoms, and make appropriate recommendations for treatment or further evaluation. The recommendations could be for individual doctors or other professionals, for hospitals or other practices, or even for telemedicine individuals or teams that the user might never visit in person. The recommendations could be based at least in part on characteristics and preferences of the personal companion user, including for example, age of doctor, gender, estimated cost and so forth. Of course, as with most everything else about personal companions, determination of situations for which warnings and recommendations are appropriate, and determining what warnings and recommendations to make are preferably crowd-sourced.

Once a user has gone to a doctor or some other professional, personal companions could crowd-source feedback as to those experiences, and in particular could prompt for feedback based upon feedback given by others. For example, a personal companion might say something along the lines of "Dr. Smith was rated by many others as being very thorough. Do you agree?"

The crowd-sourced data discussed herein could certainly be mined by researchers to help correlate signs and symptoms with diseases, and treatments with outcomes. Similarly, crowd-sourced data could be mined by police or other authorities to track down criminals.

A personal companion might also point out non-medical aspects of the user's appearance, and warn where there a likely problem, such as a shirt inside out, lipstick on wrong, hair needs cutting, too much perfume, or excessive or unusual body odor. The latter items would of course require either an odor sensor, or stored characterizations as to crinkling of nose or other features that might be seen in the faces or actions of others. A personal companion could also warn of current situations, such as low gas in an automobile, or past occurrences such as leaving home with the stove still on. See for example, row 10 in the User Preferences table in FIG. 9.

Still other contemplated examples that rely on a personal companion's ability to be context-aware include warning that plugging in the TV could overload the circuit, warning that furniture in a showroom would be too large to fit through the doorway at home, or too large or wrong color for the room, warn of potential drug interactions when a person is opening several different pill bottles, warning that lifting a given weight in a gym is too much, or warning that a given food contains too many calories, or may well cause an allergic reaction.

Other contemplated examples, which would involve characterizations from personal companions of other people, include warning that a baby at home has been crying for more than an hour, a son or daughter is leaving a party with four other kids, or with alcohol in the car.

A personal companion could view food that a person is eating, or is being served, and advise a user with respect to allergies, and special diets such as sugar free or gluten free diets.

A personal companion could project future events, such as projecting future traffic patterns based upon historical trends, and estimates probabilities of events occurring. For example, a person companion might say there is a 50% chance of an adverse occurrence if the user walks alone, at night, down a given street.

A personal companion could infer rules, or crowd-facilitate them from others. Thus, a driver new to a given country might not know a particular rule, such as a default speed limit. But his personal companion could discover that information based upon observation of the user's environment (e.g., driving a car on neighborhood streets) and inputs of others through their personal companions.

A personal companion could control equipment or make recommendations based on inference about a person. Thus, even though a house thermostat is set to 72° F., a personal companion might cause the setting to be raised, or recommend that the setting be raised, based upon an inference that a person in the room in older, and tends to get cold. Similarly a person companion might recommend that an older person eat dinner earlier in the evening based upon correlations made by personal companions of others that older persons do better when they eat dinner at an earlier time.

A personal companion could see that its user is about to send a nasty email or text, or post a mean comment, and then point out to its user that the user appears to be in a bad mood, and might want to change the content or delay sending the message. A personal companion could also advise the recipient's personal companion that the sender was in a bad mood.

Commercializing Personal Companions

One potentially lucrative avenue for making money from personal companions is to charge their users, directly or indirectly, for access to video, audio or other content. Thus, a user might ask his personal companion to listen to a song or view a video, and the personal companion might report back that the media or other information is accessible, but only upon payment of a fee.

Another avenue for making money is to charge for preventing data from getting onto any of the crowd-sourced/shared databases contemplated herein, or for removing such data.

Another avenue is to gain revenue by pushing advertisements or recommendations to users through their personal companions. Or from the other side of the coin, revenue could be realized by charging users to not receive advertisements or recommendations.

Non-Human Applications of Companions

The systems, methods and apparatus discussed herein are not necessarily directed to human users. One could have an animal companion, which might be affixed to a collar or other clothing of a dog, cat, horse, monkey, bird etc. Although the animal would have far less sophisticated communication capability that most humans, an animal companion could still observe the world about the animal, monitor biometrics, and talk to the animal in a human or animal language. For example, if a dog were trained to drop things that he put in his mouth using the phrase "drop it", the animal companion could verbally instruct the dog to drop something that he shouldn't be chewing on. The dog wouldn't be able to effectively teach the animal companion, but people in the company of the dog could talk to the animal companion to provide training. Moreover, crowd-sharing could provide an ever increasing wealth of characterizations made by others (human or otherwise).

One could also have companions for inanimate objects, as for example cars, boats, planes, trains, buildings, and robots. In those instances the companions could monitor the environment about object, and also possibly temperature, voltage, and other conditions of the object. Companions could also interact with people nearby the object. For example, a car companion might be taught to recognize people leaning on the car, and warn them to stay away. Some of the interactions with nearby people could provide training to the companions.

Epilog

It should be apparent to those skilled in the art that many more modifications besides those already described are possible without departing from the inventive concepts herein. The inventive subject matter, therefore, is not to be restricted except in the scope of the appended claims.

Moreover, in interpreting both the specification and the claims, all terms should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. Where the specification claims refers to at least one of something selected from the group consisting of A, B, C . . . and N, the text should be interpreted as requiring only one element from the group, not A plus N, or B plus N, etc.

The invention claimed is:

1. A system comprising a device having electronics configured to interact with a human being by:
   crowd-sourcing characteristic-value pairs for objects and actions from at least first and second users, by:
   (a) receiving sensor-based ambient data corresponding to an instance of a physical object located within an environment of the first user;
   (b) utilizing the information derived from the ambient data to initiate an audible, at least partially computer generated, question and answer conversation with the first user, by asking a question to the first user to assist in characterizing the instance of the object;
   (c) receiving an answer from the first user in response to the question;
   (d) utilizing the answer to inter characteristic-value pairs that generically characterize the object; and logically bind the characteristic-value pairs to the object;
   repeating steps (a) through (d) for at least the second user; and
   passively obtaining additional sensor-based ambient data in a first environment of the human being, using the crowd-sourced characteristic-value pairs to identify an additional instance of the object in the first environment, and inferring a correlation between the additional instance of the object and an action taken by the human being in the first environment;
   storing the inferred correlation in a distal service; and
   passively obtaining further sensor-based ambient data in a second environment of the human being, using the crowd-sourced characteristic-value pairs to identify a further instance of the object in the first environment, and using the inferred correlation to execute an instance of the action on behalf of the human being.

2. The system of claim 1, wherein the device includes further electronics sufficient to execute the action using an e-commerce transaction.

3. The system of claim 1, wherein the electronics is further configured to initiate the action by initiating a conversation.

4. The system of claim 1, wherein the device includes an image sensor, and at least one of the additional sensor-based ambient data and the further sensor-based ambient data is produced by the image sensor.

5. The system of claim 1, wherein at least one of the additional sensor-based ambient data and the further sensor-based ambient data is received from a source external to the housing of the device.

6. The system of claim 1, wherein the electronics is further configured to verbally identify the object to the first user during the conversation.

* * * * *

UNITED STATES PATENT AND TRADEMARK OFFICE
CERTIFICATE OF CORRECTION

PATENT NO.         : 10,055,771 B2                         Page 1 of 1
APPLICATION NO.    : 15/357686
DATED              : August 21, 2018
INVENTOR(S)        : Robert D. Fish and Skyler P. Fish It is certified that error appears in the above-identified patent and that said Letters Patent is hereby corrected as shown below:

On the Title Page

Item (71) replace:
"Skylar P. Fish, Tustin, CA (US)"
With:
"Skyler P. Fish, Tustin, CA (US)"

Signed and Sealed this
Twenty-fifth Day of December, 2018

Andrei Iancu
*Director of the United States Patent and Trademark Office*

UNITED STATES PATENT AND TRADEMARK OFFICE
CERTIFICATE OF CORRECTION

PATENT NO. : 10,055,771 B2  
APPLICATION NO. : 15/357686  
DATED : August 21, 2018  
INVENTOR(S) : Robert D. Fish et al.

It is certified that error appears in the above-identified patent and that said Letters Patent is hereby corrected as shown below:

In the Claims

At Column 41, Line 29 change, "utilizing the answer to inter characteristic-value" to --utilizing the answer to infer characteristic-value--

Signed and Sealed this  
Twenty-ninth Day of December, 2020

Andrei Iancu  
*Director of the United States Patent and Trademark Office*